(12) United States Patent
Park et al.

(10) Patent No.: US 12,399,377 B2
(45) Date of Patent: Aug. 26, 2025

(54) CAMERA MODULE INCLUDING IMAGE STABILIZATION ASSEMBLY AND ELECTRONIC DEVICE INCLUDING THE CAMERA MODULE

(71) Applicant: SAMSUNG ELECTRONICS CO., LTD., Suwon-si (KR)

(72) Inventors: Jaeheung Park, Suwon-si (KR); Hyungjin Rho, Suwon-si (KR); Hwajoong Jung, Suwon-si (KR); Bongchan Kim, Suwon-si (KR); Taehwan Kim, Suwon-si (KR); Kwangseok Byon, Suwon-si (KR); Kihuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/703,289

(22) PCT Filed: Mar. 17, 2022

(86) PCT No.: PCT/KR2022/003768
§ 371 (c)(1),
(2) Date: Mar. 24, 2022

(87) PCT Pub. No.: WO2022/203285
PCT Pub. Date: Sep. 29, 2022

(65) Prior Publication Data
US 2024/0111172 A1 Apr. 4, 2024

(30) Foreign Application Priority Data
Mar. 25, 2021 (KR) .................. 10-2021-0038740

(51) Int. Cl.
*G02B 27/64* (2006.01)
*G03B 5/00* (2021.01)
*H04N 23/54* (2023.01)

(52) U.S. Cl.
CPC ............. *G02B 27/646* (2013.01); *G03B 5/00* (2013.01); *H04N 23/54* (2023.01); *G03B 2205/0007* (2013.01); *G03B 2205/0069* (2013.01)

(58) Field of Classification Search
CPC ............. G02B 13/0065; G02B 27/646; H04N 23/687; G03B 5/00
See application file for complete search history.

(56) References Cited

U.S. PATENT DOCUMENTS 7,558,473 B2 7/2009 Shin et al.
7,701,486 B2 4/2010 Kosaka et al.
(Continued)

FOREIGN PATENT DOCUMENTS

JP 2006-349942 12/2006
JP 2008-077047 4/2008
(Continued)

OTHER PUBLICATIONS

International Search Report and Written Opinion of the International Searching Authority for PCT/KR2022/003768 dated Jul. 6, 2022, 9 pages.
(Continued)

*Primary Examiner* — Noam Reisner
(74) *Attorney, Agent, or Firm* — Nixon & Vanderhye, P.C.

(57) ABSTRACT

Disclosed is a camera module. The camera module includes a lens assembly including a lens and an image stabilization assembly including a moving member including a first substrate and an image sensor electrically connected to the
(Continued)

first substrate, the image stabilization assembly being connected to the lens assembly wherein an optical axis is at least partially aligned with the image sensor. The image stabilization assembly is configured to move the moving member in at least one direction perpendicular to the optical axis such that the optical axis is aligned with a specified position on the image sensor.

18 Claims, 19 Drawing Sheets

(56) References Cited

U.S. PATENT DOCUMENTS

| | | | |
|---|---|---|---|
| 8,279,293 | B2 | 10/2012 | Noto |
| 8,345,111 | B2 | 1/2013 | Kosaka et al. |
| 11,218,637 | B2 | 1/2022 | Urakami |
| 11,635,630 | B2 | 4/2023 | Xu et al. |
| 2006/0017815 | A1* | 1/2006 | Stavely ............. H04N 23/687 |
| | | | 348/208.7 |
| 2006/0070302 | A1* | 4/2006 | Seo .................. H04N 23/54 |
| | | | 52/6 |
| 2006/0092285 | A1 | 5/2006 | Shin |
| 2006/0269262 | A1* | 11/2006 | Shin .................. G03B 5/02 |
| | | | 348/E5.046 |
| 2007/0025710 | A1 | 2/2007 | Shin et al. |
| 2010/0157133 | A1 | 6/2010 | Kosaka et al. |
| 2011/0050921 | A1 | 3/2011 | Noto |
| 2017/0094174 | A1 | 3/2017 | Asakawa et al. |
| 2017/0276914 | A1* | 9/2017 | Yao .................. G02B 13/0035 |
| 2019/0361323 | A1* | 11/2019 | Jerby ................. G02B 27/646 |
| 2020/0314343 | A1 | 10/2020 | Urakami |
| 2020/0409171 | A1 | 12/2020 | Xu et al. |
| 2022/0014677 | A1* | 1/2022 | Smyth .................. G02B 7/09 |

FOREIGN PATENT DOCUMENTS

| | | |
|---|---|---|
| JP | 2011-053241 | 3/2011 |
| JP | 2017-067878 | 4/2017 |
| JP | 2020-160163 | 10/2020 |
| KR | 10-2006-0039808 | 5/2006 |
| KR | 10-0663276 | 1/2007 |
| KR | 10-2007-0070145 | 7/2007 |
| WO | 2008/133356 | 11/2008 |

OTHER PUBLICATIONS

Extended Search Report dated 2024-05-17 in European Patent Application No. 22775987.5.
Office Action dated Jul. 16, 2025 in EP Application No. 22775987.5.

* cited by examiner

CAMERA MODULE INCLUDING IMAGE STABILIZATION ASSEMBLY AND ELECTRONIC DEVICE INCLUDING THE CAMERA MODULE

CROSS-REFERENCE TO RELATED APPLICATIONS

This application is a continuation of International Application No. PCT/KR2022/003768 designating the United States, filed on Mar. 17, 2022, in the Korean Intellectual Property Receiving Office and claiming priority to Korean Patent Application No. 10-2021-0038740, filed on Mar. 25, 2021, in the Korean Intellectual Property Office, the disclosures of which are incorporated by reference herein in their entireties.

BACKGROUND

Field

The disclosure relates to a camera module including an image stabilization assembly and an electronic device including the camera module.

Description of Related Art

An electronic device may include at least one camera module. The camera module may include an image stabilization assembly to compensate for a shake of the camera module. For example, to correct an image when disturbances occur, the image stabilization assembly may be configured to change the position of light incident through a lens and formed on an image sensor.

The camera module may include the image stabilization assembly for supporting a function related to image stabilization. The image stabilization assembly may perform an operation for image correction when disturbances (e.g., a drop impact, a shaking movement of a user's hand, or vibration) are applied to the camera module and/or the electronic device. For example, the image stabilization assembly may be configured to linearly move the image sensor in at least two axial directions perpendicular to the optical axis.

SUMMARY

Embodiments of the disclosure provide an image stabilization assembly that may move an image sensor such that light passing through a lens assembly after being reflected from an object is condensed to a specified position on the image sensor. To this end, the image stabilization assembly may include a guide structure, a coil, and a magnet.

The technical problems addressed by the disclosure are not limited to the aforementioned problems, and any other technical problems not mentioned herein will be clearly understood from the following description by those skilled in the art to which the disclosure pertains.

A camera module according to an example embodiment of the disclosure includes: a lens assembly including a lens and an image stabilization assembly including a moving member including a first substrate and an image sensor electrically connected to the first substrate, the image stabilization assembly being connected to the lens assembly such that an optical axis is at least partially aligned with the image sensor. The image stabilization assembly is configured to move the moving member in at least one direction perpendicular to the optical axis such that the optical axis is aligned with a specified position on the image sensor.

According to various example embodiments of the disclosure, in response to disturbances applied to the camera module and/or the electronic device, the image stabilization assembly may perform an image correction function by moving the image sensor. Accordingly, image quality may be improved.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
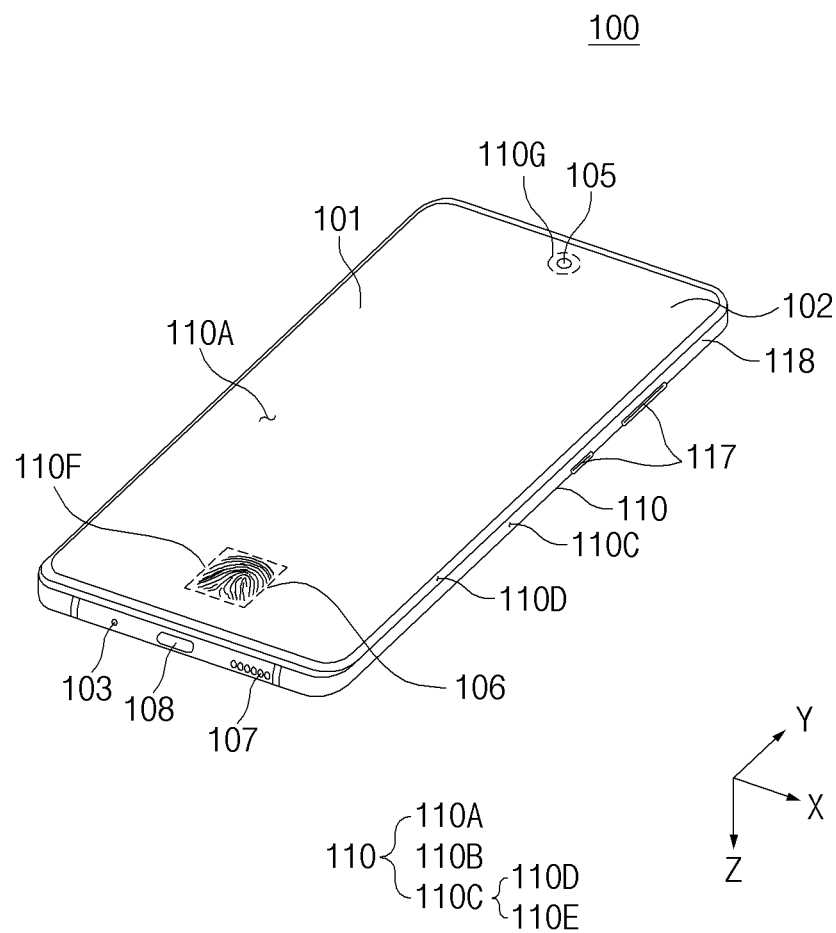
FIG. 1 is a front perspective view of an electronic device according to various embodiments.
Figure 2:
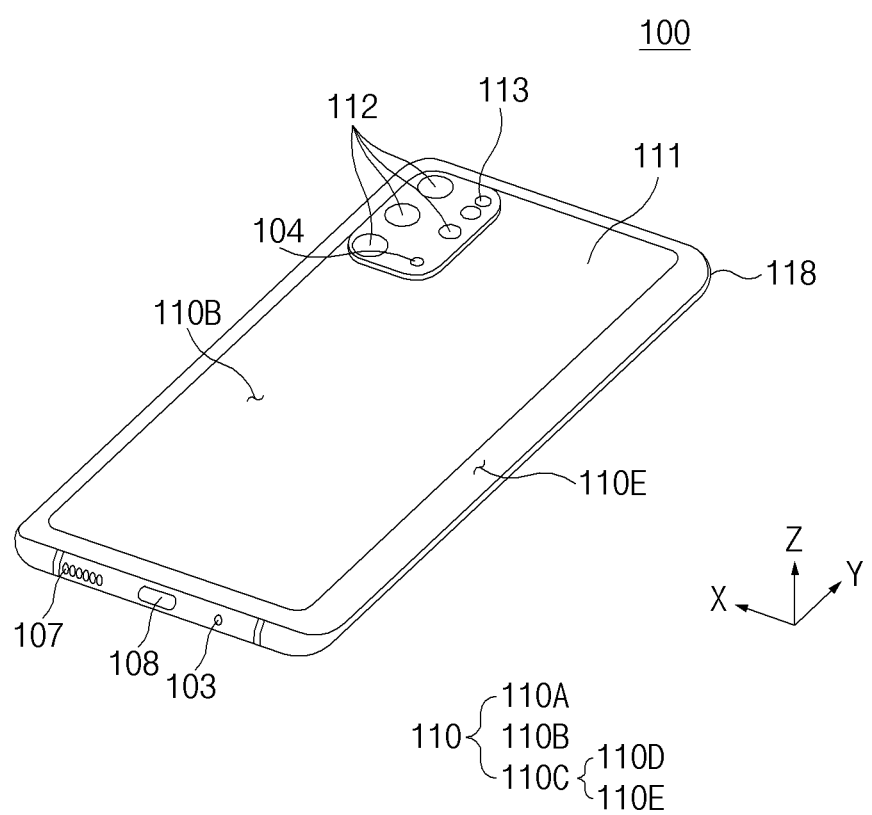
FIG. 2 is a rear perspective view of the electronic device according to various embodiments.

FIG. 1 is a front perspective view of an electronic device according to various embodiments. FIG. 2 is a rear perspective view of the electronic device according to various embodiments.

Referring to FIGS. 1 and 2, the electronic device 100 may include a housing 110 that includes a first surface (or, a front surface) 110A, a second surface (or, a rear surface) 110B, and a side surface 110C surrounding the space between the first surface 110A and the second surface 110B.

In an embodiment (not illustrated), the housing 110 may refer to a structure that forms some of the first surface 110A, the second surface 110B, and the side surface 110C.

In an embodiment, the first surface 110A may be formed by a front plate 102 (e.g., a front plate 120 of FIG. 3), at least a portion of which is substantially transparent. For example, the front plate 102 may include a glass plate including various coating layers, or a polymer plate.

In an embodiment, the second surface 110B may be formed by a back plate 111 (e.g., a back plate 180 of FIG. 3) that is substantially opaque. The back plate 111 may be formed of, for example, coated or colored glass, ceramic, a polymer, metal (e.g., aluminum, stainless steel (STS), or magnesium), or a combination of at least two of the aforementioned materials. The side surface 110C may be formed by a side bezel structure (or, a "frame structure") 118 that is coupled with the front plate 102 and the back plate 111 and that contains metal and/or a polymer.

In an embodiment, the back plate 111 and the side bezel structure 118 (e.g., a side bezel structure 141 of FIG. 3) may be integrally formed with each other and may contain the same material (e.g., a metallic material such as aluminum).

In the illustrated embodiment, the front plate 102 may include two first areas 110D that curvedly and seamlessly extend from partial areas of the first surface 110A toward the back plate 111. The first areas 110D may be located at opposite long edges of the front plate 102.

In the illustrated embodiment, the back plate 111 may include two second areas 110E that curvedly and seamlessly extend from partial areas of the second surface 110B toward the front plate 102. The second areas 110E may be located at opposite long edges of the back plate 111.

In an embodiment, the front plate 102 (or, the back plate 111) may include only one of the first areas 110D (or, the second areas 110E). Furthermore, in an embodiment, the front plate 102 (or, the back plate 111) may not include a part of the first areas 110D (or, the second areas 110E).

In an embodiment, when viewed from a side of the electronic device 100, the side bezel structure 118 may have a first thickness (or, width) at sides (e.g., short sides) not including the first areas 110D or the second areas 110E and may have a second thickness at sides (e.g., long sides) including the first areas 110D or the second areas 110E, the second thickness being smaller than the first thickness. In various embodiments, the side bezel structure 118 may be integrally formed with the back plate 111.

In an embodiment, the electronic device 100 may include at least one of a display 101 (e.g., a display 130 of FIG. 3 or a display module 1860 of FIG. 18), audio modules 103, 104, and 107, a sensor module (e.g., a sensor module 1876 of FIG. 18), camera modules 105 and 112, key input devices 117, a light emitting element (not illustrated), or a connector hole 108. In an embodiment, at least one component (e.g., the key input devices 117 or the light emitting element (not illustrated)) among the aforementioned components may be omitted from the electronic device 100, or other component(s) may be additionally included in the electronic device 100.

In an embodiment, the display 101 may be visible through at least a portion of the front plate 102. For example, at least a portion of the display 101 may be visible through the front plate 102 that includes the first surface 110A and the first areas 110D of the side surface 110C.

In an embodiment, the shape of the display 101 may be formed to be substantially the same as the shape of the adjacent outside edge of the front plate 102. In an embodiment (not illustrated), to expand the area by which the display 101 is visible, the gap between the periphery of the display 101 and the periphery of the front plate 102 may be substantially constant.

In an embodiment, a surface of the housing 110 (or, the front plate 102) may include a screen display area through which the display 101 is visually exposed (e.g., visible) and on which contents are displayed through pixels. For example, the screen display area may include the first surface 110A and the first areas 110D of the side surface.

In an embodiment (not illustrated), the display 101 may include, or may be disposed adjacent to, touch detection circuitry, a pressure sensor for measuring the intensity (pressure) of a touch, and/or a digitizer for detecting a stylus pen of a magnetic field type.

In an embodiment, the screen display area 110A and 110D may include a sensing area 110F and/or a camera area 110G.

In an embodiment, the sensing area 110F may at least partially overlap the screen display area 110A and 110D. The sensing area 110F may refer to an area that displays contents likewise to the other areas of the screen display area 110A and 110D and that additionally passes an input signal related to a second sensor module 106.

In an embodiment, the second sensor module 106 may be at least partially disposed under the screen display area 110A and 110 and may form the sensing area 110F in at least a portion of the screen display area 110A and 110D. The second sensor module 106 may be configured to receive an input signal passing through the sensing area 110F and generate an electrical signal based on the received input signal. For example, the input signal may have a specified physical quantity (e.g., heat, light, temperature, sound, pressure, or ultrasonic waves). For example, the input signal may include a signal related to biometric information (e.g., a fingerprint) of a user.

For example, the second sensor module 106 may include an optical fingerprint sensor configured to receive light. For example, the second sensor module 106 may be configured to receive an optical signal that is emitted from a pixel included in the display 101 and reflected by a fingerprint of the user's finger and that passes through the sensing area 110F.

For example, the second sensor module 106 may include an ultrasonic fingerprint sensor configured to transmit and receive ultrasonic waves. For example, the second sensor module 106 may be configured to transmit ultrasonic waves toward a fingerprint of the user's finger and receive the ultrasonic waves that are reflected by the finger and that pass through the sensing area 110F.

In an embodiment, the camera area may at least partially overlap the screen display area 110A and 110D. The camera area 110G may refer to an area (e.g., a transmissive area) that displays contents likewise to the other areas of the screen display area 110A and 110D and that additionally passes an optical signal related to the first sensor module 105. For example, the camera area 110G may be configured to display contents likewise to the other areas of the screen display area 110A and 110D when the first camera module 105 does not operate. In an embodiment, the camera area 110G of the display 110 may be formed to be a transmissive area having a specified transmittance, and the transmissive area may be formed to have a transmittance of about 20% to about 40%. For example, the transmissive area may include an area overlapping an effective area (e.g., a field of view (FOV)) of the first camera module 105 through which light incident on an image sensor to generate an image passes. For example, the transmissive area of the display 110 may include an area having a lower pixel density and/or wiring density than a surrounding area.

In an embodiment, the first camera module 105 may be at least partially disposed under the screen display area 110A and 110D and may be configured to receive light passing through the camera area 110G. For example, light received by the first camera module 105 may include light reflected by or emitted from an object. The first camera module 105 may be configured to generate an image-related electrical signal based on the received light. The first camera module 105 may not be exposed on a surface (e.g., the front surface 110A) of the electronic device 100. For example, the first camera module 105 may be hidden by contents displayed on the camera area 110G. For example, the first camera module 105 may be disposed such that the optical axis of a lens included in the first camera module 105 passes through the camera area 110G included in the display 101.

In an embodiment, the second camera module 112 may include a plurality of camera modules (e.g., a dual camera, a triple camera, or a quad camera). However, the second camera module 112 is not necessarily limited to including the plurality of camera modules and may include one camera module.

In an embodiment, the first camera module 105 and/or the second camera module 112 may include one or more lenses, an image sensor, and/or an image signal processor. A flash 113 may include, for example, a light emitting diode or a xenon lamp. In an embodiment, two or more lenses (an infrared camera lens, a wide angle lens, and a telephoto lens) and image sensors may be disposed in the housing to face toward one surface (e.g., the second surface 110B) of the electronic device 100.

In an embodiment, the sensor module (e.g., the sensor module 1876 of FIG. 18) and/or the second sensor module 106 may generate an electrical signal or a data value that corresponds to an operational state inside the electronic device 100 or an environmental state external to the electronic device 100. In an embodiment, the sensor module (not illustrated) may be disposed on at least a portion of the first surface 110A, the second surface 110B, or the side surface 110C (e.g., the first areas 110D and/or the second areas 110E) of the housing 110.

In various embodiments, the sensor module (e.g., the sensor module 1876 of FIG. 18) and/or the second sensor module 106 may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor. In various embodiments (not illustrated), the fingerprint sensor may be disposed on the second surface 110B.

In an embodiment, the audio modules 103, 104, and 107 may include the microphone holes 103 and 104 and the speaker hole 107.

In an embodiment, the microphone holes 103 and 104 may include the first microphone hole 103 formed in a partial area of the side surface 110C and the microphone hole 104 formed in a partial area of the second surface 110B. Microphones for obtaining external sounds may be disposed in the housing 110 to correspond to the microphone holes 103 and 104. The microphones may each include a plurality of microphones to detect the direction of a sound.

In an embodiment, the second microphone hole 104 formed in the partial area of the second surface 110B may be disposed adjacent to the camera modules 105 and 112. For example, the second microphone hole 104 may obtain sounds when the camera modules 105 and 112 are executed, or may obtain sounds when other functions are executed.

In an embodiment, the speaker hole 107 may include a receiver hole for telephone call (not illustrated). The speaker hole 107 may be formed in a portion of the side surface 110C of the electronic device 100. In an embodiment, the speaker hole 107, together with the microphone hole 103, may be implemented as a single hole. Although not illustrated, the receiver hole for telephone call (not illustrated) may be formed in another portion of the side surface 110C. For example, the receiver hole for telephone call (not illustrated) may be formed in another portion (e.g., a portion facing the +Y-axis direction) of the side surface 110C that faces the portion (e.g., a portion facing the −Y-axis direction) of the side surface 110C in which the speaker hole 107 is formed.

In an embodiment, the electronic device 100 may include a speaker fluidly connected with the speaker hole 107. In an embodiment, the speaker may include a piezoelectric speaker that does not have the speaker hole 107.

In an embodiment, the key input devices 117 may be disposed on the side surface 110C (e.g., the first areas 110D and/or the second areas 110E) of the housing 110. In an embodiment, the electronic device 100 may not include all or some of the key input devices 117, and the key input devices 117 not included may be implemented in a different form, such as a soft key, on the display 101. In an embodiment, the key input devices may include the second sensor module 106 that forms the sensing area 110F included in the screen display area 110A and 110D.

In an embodiment, the connector hole 108 may accommodate a connector. The connector hole 108 may be disposed in the side surface 110C of the housing 110. For example, the connector hole 108 may be disposed in the side surface 110c so as to be adjacent to at least a part of the audio modules (e.g., the microphone hole 103 and the speaker hole 107). In an embodiment, the electronic device 100 may include the first connector hole 108 capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving audio signals with an external electronic device.

In an embodiment, the electronic device 100 may include the light emitting element (not illustrated). For example, the light emitting element (not illustrated) may be disposed on the first surface 110A of the housing 110. The light emitting element (not illustrated) may provide state information of the electronic device 100 in the form of light. In an embodiment, the light emitting element (not illustrated) may provide a light source that operates in conjunction with operation of the first camera module 105. For example, the light emitting element (not illustrated) may include an LED, an IR LED, and/or a xenon lamp.

In an embodiment, the electronic device 100 may have an exterior of a bar type or a plate type, but is not limited thereto. For example, the illustrated electronic device 100 may be part of a foldable electronic device, a slidable electronic device, a stretchable electronic device, and/or a rollable electronic device.

The foldable electronic device, the slidable electronic device, the stretchable electronic device, and/or the rollable electronic device may be configured to mechanically operate such that a screen display area is expanded or reduced through selection by a user and may include a display configured such that the shape is deformed in response to the mechanical operation. For example, the display may include an area that can be bent to a curved shape or unbent to a flat shape. For example, the display may be formed to be foldable, slidable, or rollable in response to the mechanical operation of the electronic device.

Figure 3:
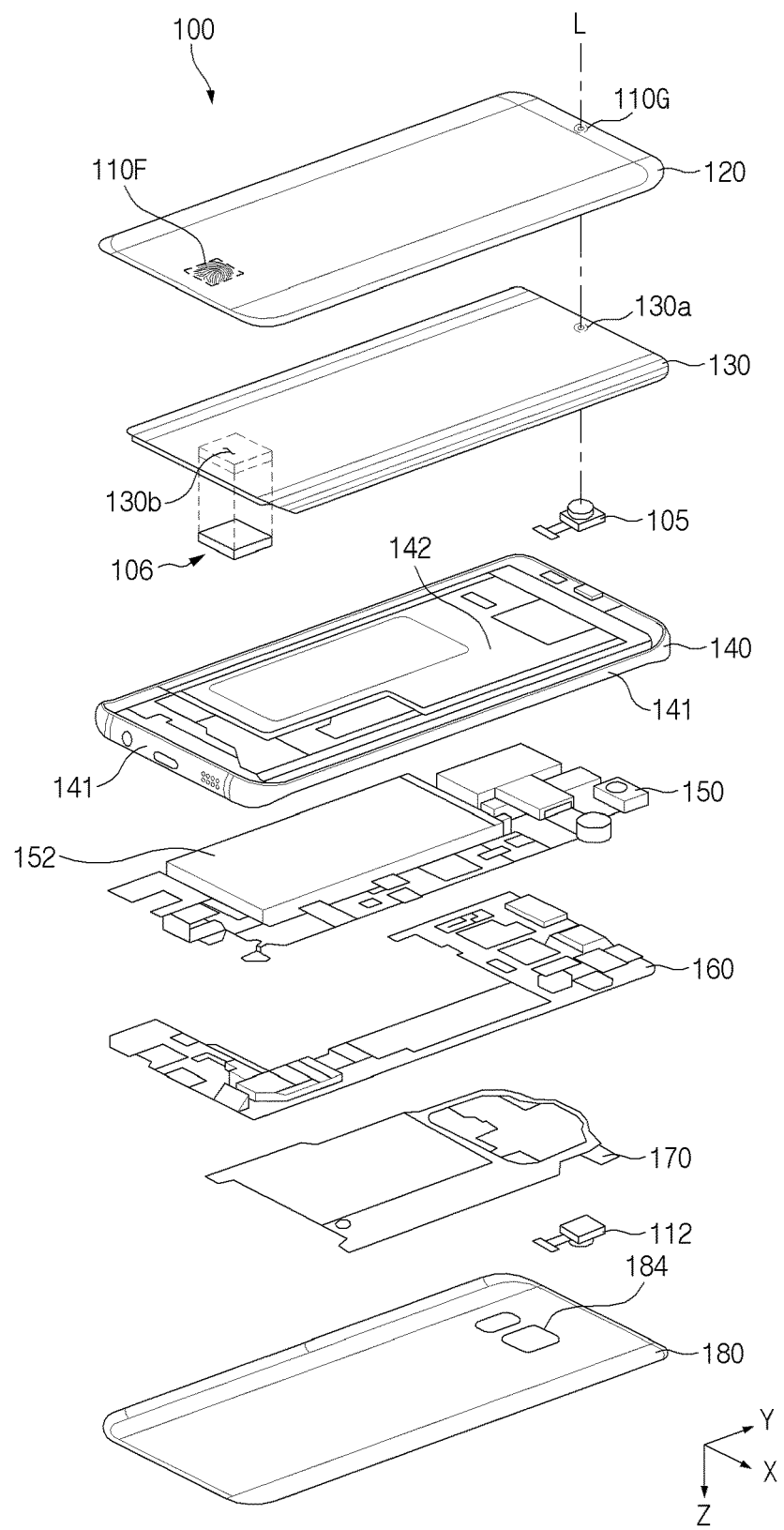
FIG. 3 is an exploded perspective view of the electronic device according to various embodiments.

FIG. 3 is an exploded perspective view of the electronic device according to various embodiments.

Referring to FIG. 3, the electronic device 100 may include the front plate 120 (e.g., the front plate 102 of FIG. 1), the display 130 (e.g., the display 101 of FIG. 1), a first support member 140 (e.g., a bracket), a printed circuit board 150 (e.g., a printed circuit board (PCB), a flexible PCB (FPCB), or a rigid-flexible PCB (RFPCB)), a battery 152, a second support member 160 (e.g., a rear case), an antenna 170, the back plate 180 (e.g., the back plate 111 of FIG. 2), the second sensor module 106, the first camera module 105, and the second camera module 112.

In various embodiments, the front plate 120, the back plate 180, and the side bezel structure 141 of the first support member 140 may form a housing (e.g., the housing 110 of FIGS. 1 and 2).

In various embodiments, the electronic device 100 may not include at least one component (e.g., the first support member 140 or the second support member 160) among the aforementioned components, or may additionally include other component(s). At least one of the components of the electronic device 100 may be identical or similar to at least one of the components of the electronic device 100 of FIG. 1 or FIG. 2, and repetitive descriptions will hereinafter be omitted.

In an embodiment, the display 130 may be coupled to, or located on, one surface of the first support member 140, and the printed circuit board 150 may be coupled to, or located on, an opposite surface of the first support member 140.

In an embodiment, the first support member 140 may include the side bezel structure (e.g., the side bezel structure 118 of FIG. 1) and a plate structure 142. For example, the side bezel structure 141 may form at least a portion of a surface (e.g., the side surface 110C) of the electronic device. In an embodiment, the side bezel structure 141 may be formed to connect the peripheries of the front plate 120 and the back plate 180. In an embodiment, the display 130 and the printed circuit board 150 may be coupled to, or located on, the plate structure 142. The plate structure 142 may be located in the space between the front plate 120 and the back plate 180. The plate structure 142 may at least partially face the display 130. The first support member 140 may be formed of, for example, a metallic material and/or a non-metallic (e.g., polymer) material. In various embodiments, the side bezel structure 141 and the plate structure 142 may be integrally formed with each other, or may be coupled to be detachable from each other.

In an embodiment, a processor, memory, and/or an interface may be disposed on the printed circuit board 150. The processor may include, for example, one or more of a central processing unit, an application processor, a graphic processing unit, an image signal processor, a sensor hub processor, or a communication processor.

In an embodiment, the memory may include, for example, volatile memory or nonvolatile memory.

In an embodiment, the interface may include, for example, a high definition multimedia interface (HDMI), a universal serial bus (USB) interface, an SD card interface, and/or an audio interface. For example, the interface may electrically or physically connect the electronic device 100 with an external electronic device and may include a USB connector, an SD card/MMC connector, or an audio connector.

In an embodiment, the battery 152, which is a device for supplying electric power to at least one component of the electronic device 100, may include, for example, a primary cell that is not rechargeable, a secondary cell that is rechargeable, or a fuel cell. At least a portion of the battery 152, for example, may be disposed on substantially the same plane as the printed circuit board 150. The battery 152 may be integrally disposed inside the electronic device 100, or may be disposed to be detachable from the electronic device 100.

In an embodiment, the antenna 170 may be disposed between the back plate 180 and the battery 152. The antenna 170 may include, for example, a near field communication (NFC) antenna, a wireless charging antenna, and/or a magnetic secure transmission (MST) antenna. For example, the antenna 170 may perform short-range communication with an external device, or may wirelessly transmit and receive power required for charging. In an embodiment, the antenna 170 may be provided by a portion of the first support member 140. For example, the antenna 150 may be provided by a portion of the side bezel structure and/or a portion of the plate structure, or a combination thereof.

In an embodiment, the first camera module 105 (e.g., an under display camera (UDC)) may be at least partially accommodated in a first recess 130a formed in the display 130. For example, the first recess 130a may include an opening penetrating the back panel. For example, the opening or the first recess 130a may be formed in consideration of the field of view (FOV) of the first camera module 105. In an embodiment, the first camera module 105 may receive light transmitting through a partial area (e.g., the camera area 110G) of a front panel of the display 130. The first camera module 105 may be disposed such that an optical axis L passes through the camera area 110G. For example, the first camera module 105 may be coupled to a layer of the display 130, or may be located on an internal structure (e.g., the plate structure 142). For example, the first camera module 105 may be attached to the rear surface of the layer of the display 130.

In an embodiment, the second sensor module 106 may be at least partially accommodated in a second recess 130*b* formed in the display 130. For example, the second recess 130*b* may include an opening penetrating the back panel. For example, the second sensor module 106 may receive an input signal transmitting through a partial area (e.g., the sensing area 110F) of the front panel of the display 130. The second sensor module 106 may be disposed such that at least a portion thereof is located in the second recess 130*b*. In various embodiments, the second sensor module 106 may be attached to the rear surface of the front panel of the display 130.

In an embodiment, the first camera module 105 may be at least partially accommodated in the first recess 130*a*, and the second sensor module 106 may be at least partially accommodated in the second recess 130*b*. Accordingly, the thickness (e.g., the thickness in the Z-axis direction) of the electronic device 100 may be decreased.

In an embodiment (not illustrated), the first camera module 105 may include a punch hole camera at least partially accommodated in a punch hole formed in the display 130. For example, the punch hole may be understood as the first recess 130*a* that extends to a display panel. For example, the punch hole camera may receive light transmitting through a partial area (e.g., the camera area 110G) of the front plate 120. In the above-described embodiment, contents may not be displayed on the camera area 110G.

In an embodiment, the second camera module 112 may be configured to receive light through a second camera area 184 formed in the back plate 180. The second camera area 184 may include a transparent area. In various embodiments, the second camera module 112 may include a plurality of camera modules (e.g., a dual camera, a triple camera, or a quad camera).

Figure 4:
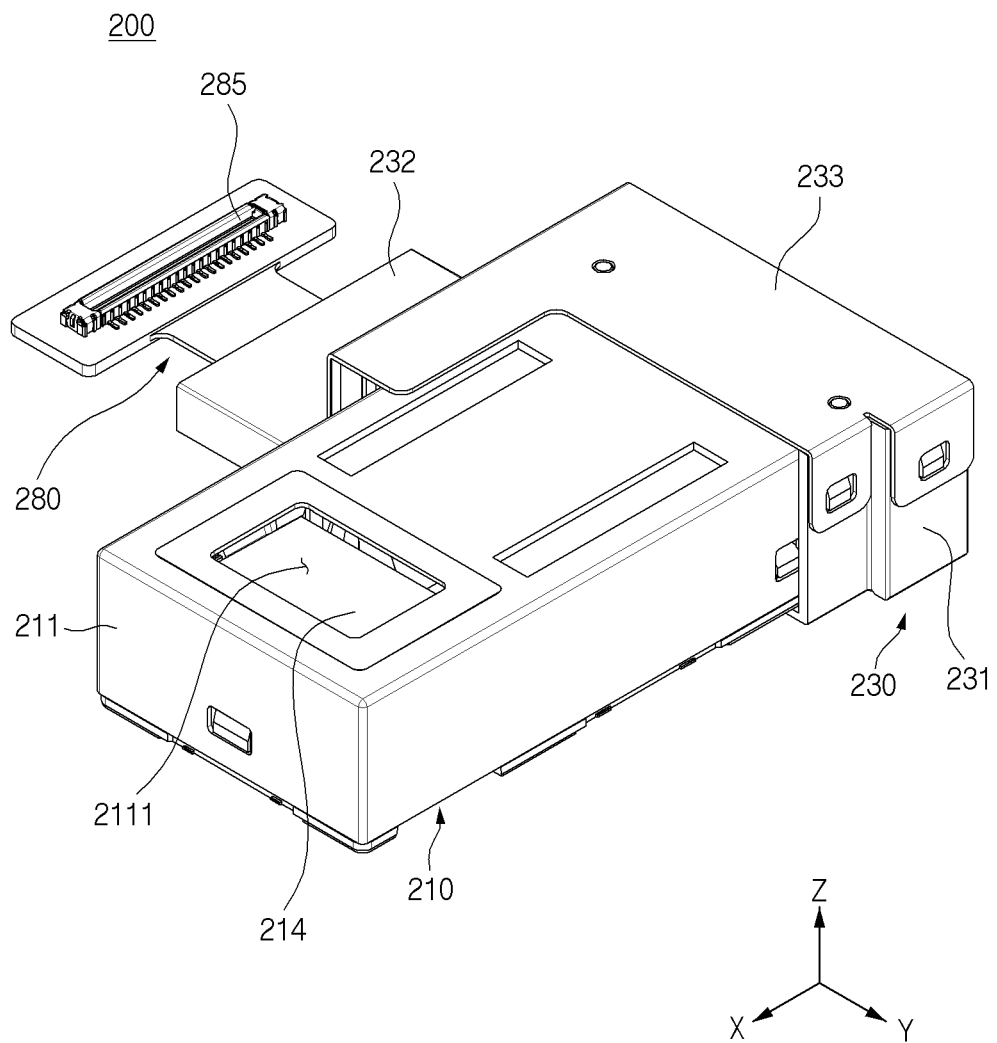
FIG. 4 is a perspective view illustrating a camera module according to various embodiments.
Figure 5:
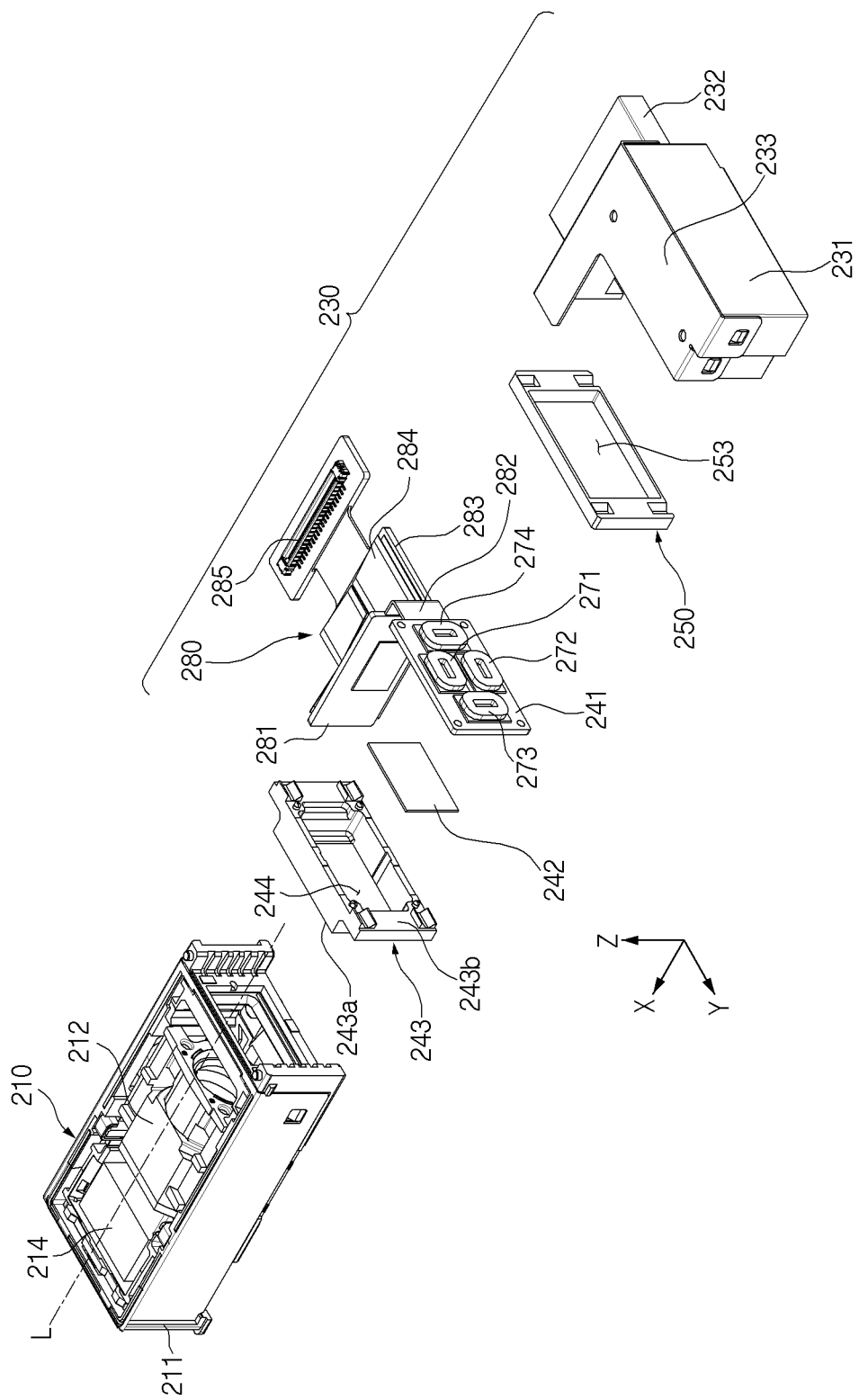
FIG. 5 is an exploded perspective view illustrating a lens assembly and an image stabilization assembly of the camera module according to various embodiments.
Figure 6:
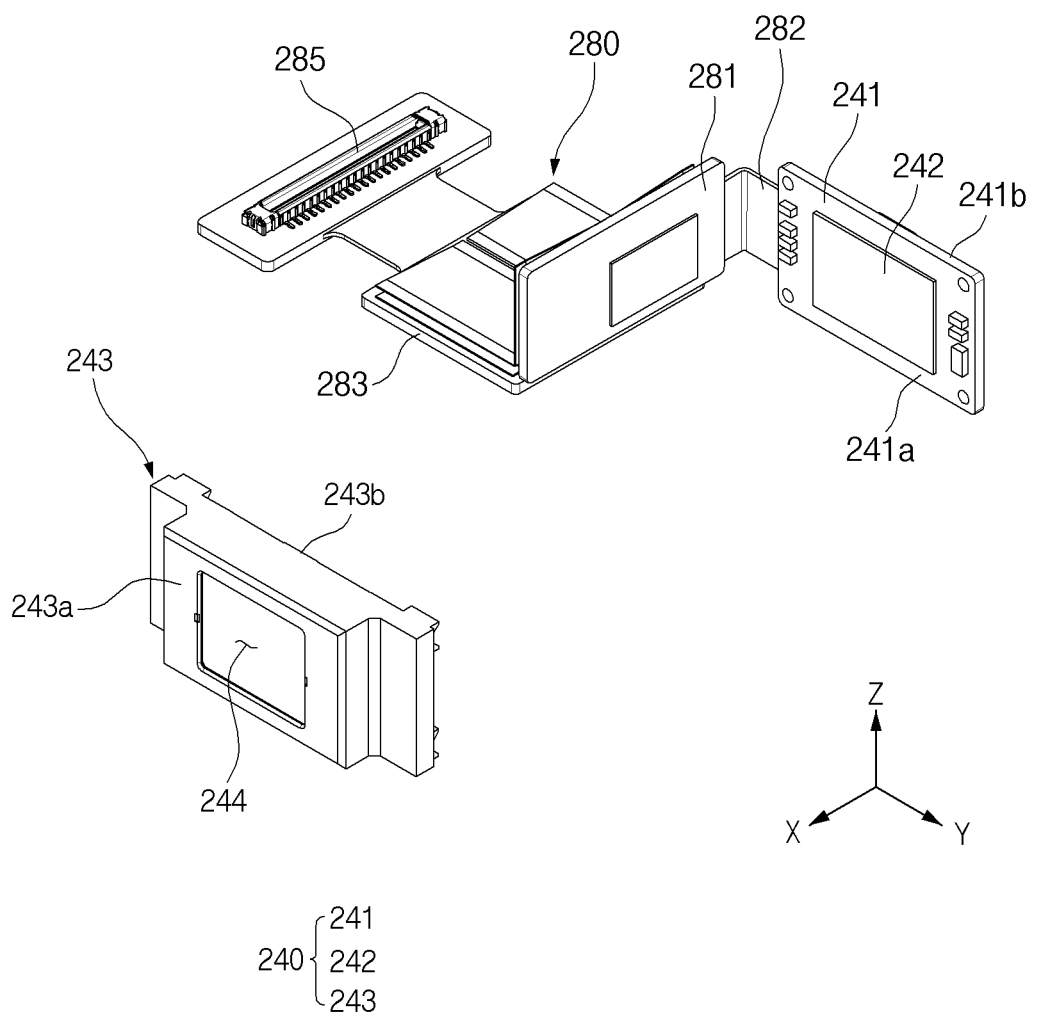
FIG. 6 is an exploded perspective view illustrating a moving member of the image stabilization assembly according to various embodiments.

FIG. 4 is a perspective view illustrating a camera module according to various embodiments. FIG. 5 is an exploded perspective view illustrating a lens assembly and an image stabilization assembly of the camera module according to various embodiments. FIG. 6 is an exploded perspective view illustrating a moving member of the image stabilization assembly according to various embodiments.

In an embodiment, the camera module 200 may include the lens assembly 210 and the image stabilization assembly 230. The lens assembly 210 may include a camera housing 211, a lens unit (e.g., including a lens) 212, and a reflective member 214.

In an embodiment, the lens unit 212 and the reflective member 214 may be disposed in the camera housing 211. The camera housing 211 may be connected with a cover 233 of the image stabilization assembly 230. In various embodiments, the camera housing 211 and the cover 233 may be integrally formed with each other. In an embodiment, the camera housing 211 may have, in a first surface thereof, a light receiving area 2111 through which the reflective member (e.g., including a reflective material) 214 is exposed. For example, the first surface may be parallel to a portion of a surface (e.g., the rear surface 110B) of the electronic device 100, or may form a portion of a surface (e.g., the rear surface 110B) of the electronic device. For example, light reflected from an object may travel to the reflective member 214 through the light receiving area 2111. For example, the light receiving area 2111 may include an opening area through which the reflective member 214 is directly exposed, or may include a transparent area. In various embodiments, the light receiving area 2111 of the camera housing 211 may be at least partially aligned with a transparent area (e.g., the second camera area 184) of a surface (e.g., the rear surface 110B) of the electronic device 100.

In an embodiment, the lens unit 212 may be located in the camera housing 211. The lens unit 212 may include one or a plurality of lenses. The plurality of lenses may define an optical axis L. For example, the optical axis L may extend in substantially the X-axis direction. The optical axis L may be refracted or reflected by the reflective member 214. The refracted or reflected optical axis L may extend outside the camera housing 211 through the reflective member 214.

In an embodiment, the lens unit 212 may be disposed between the reflective member 214 and the image stabilization assembly 230 when viewed in the direction of the optical axis L (e.g., the X-axis direction). For example, the lens unit 212 may be disposed between the reflective member 214 and an image sensor 242 when viewed in the direction of the optical axis L. In an embodiment, the reflective member 214 and the image sensor 242 of the image stabilization assembly 230 may be at least partially disposed on the optical axis L. The reflective member 214 may be disposed in a first optical axis direction (e.g., the X-axis direction) with respect to the lens unit 212, and the image sensor 242 may be disposed in a second optical axis direction (e.g., the –X-axis direction) with respect to the lens unit 212.

In an embodiment, the reflective member 214 may be located in the camera housing 211. In an embodiment, the reflective member 214 may be located in the first optical axis direction (e.g., the X-axis direction) with respect to the lens unit 212 when viewed in the direction of the optical axis L. The lens unit 212 and the image sensor 242 (e.g., an image sensor 1930 of FIG. 19) may be located in the second optical axis direction (e.g., the –X-axis direction) with respect to the reflective member 214. In an embodiment, the reflective member 214 may be configured to reflect or refract light reflected from the object. For example, the light reflected from the object located in the Z-axis direction may be incident on the reflective member through the light receiving area 2111, and the incident light may be reflected and/or refracted by the reflective member 214 and may travel to the image sensor 242 through the plurality of lenses. The plurality of lenses may condense the light reflected or refracted by the reflective member 214. The condensed light may form an image on the image sensor 242 of the image stabilization assembly 230. In various embodiments, the reflective member 214 may include a prism, a periscope lens, or an inclined mirror.

In various embodiments, the lens assembly 210 (e.g., a lens assembly 1910 of FIG. 19) may further include a focus drive unit configured to move at least a portion of the lens unit in the direction of the optical axis L. For example, the focus drive unit may include a magnet disposed on one of the lens unit 212 or the camera housing 211 and a coil disposed on the other one. For example, the camera module 200 may be configured to perform a zoom function and/or an auto focus function by moving the lens unit 212 in the direction of the optical axis using the focus drive unit.

In an embodiment, the image stabilization assembly 230 may include a fixed frame 231, the cover 233, the moving member 240, a guide structure 250, and a connecting member 280. For example, the cover 233 and/or the fixed frame 231 may be connected to, or integrally formed with, the camera housing 211. In various embodiments, the cover 233 and the fixed frame 231 may be integrally formed with each other, or may be coupled to be detachable from each other. The cover 233 and the fixed frame 231 may form a space in which the moving member 240 is disposed. The fixed frame 231 may include an extending portion 232 surrounding at least a portion of the connecting member 280.

In an embodiment, the moving member 240 may be configured to move in a direction perpendicular to the optical axis L. For example, the image stabilization assembly 230 may perform an image stabilization function in response to external noise applied to the camera module 200. For example, the image stabilization assembly 230 may perform the image stabilization function by moving the moving member 240 in the direction perpendicular to the optical axis L. For example, light reflected from the object may pass through the lens assembly 210 and may form an image on the image sensor 242. The image formed on the image sensor 242 may be shaken by the external noise. For example, the optical axis L may not be aligned with the center of the image sensor 242. In this case, the image stabilization assembly 230 may compensate for the image shake by moving the moving member 240 including the image sensor 242 in at least two directions substantially perpendicular to the optical axis L.

In an embodiment, the moving member 240 may include a holder 243, a first substrate 241, the image sensor 242, and coils 271, 272, 273, and 274. In an embodiment, the holder 243 may be coupled with the first substrate 241 so as to move together with the first substrate 241. For example, the holder 243 may have a protrusion fit into a hole of the first substrate 241, or may have a hole into which a protrusion formed on the first substrate 241 is fit. Accordingly, the holder 243 may move together with the image sensor 242 and the first substrate 241 when the image stabilization function is performed.

In an embodiment, the holder 243 may include a first surface 243a facing toward the lens assembly 210 and a second surface 243b facing toward the guide structure 250. In an embodiment, an opening area 244 may be formed in the holder 243 such that the image sensor 242 and the holder 243 face each other. The opening area 244 may penetrate the first surface 243a and the second surface 243b. The guide structure 250 may be coupled to the second surface 243b of the holder 243. Light passing through the lens assembly 210 may be condensed on the image sensor through the opening area 244.

In an embodiment, the first substrate 241 may include a first surface 241a facing toward the lens assembly 210 and a second surface 241b facing away from the first surface 241a. For example, the first surface 241a may be a surface facing the first optical axis direction (e.g., the +X-axis direction), and the second surface may be a surface facing the second optical axis direction (e.g., the −X-axis direction). In an embodiment, the image sensor 242 may be disposed on the first surface 241a of the first substrate 241, and one or more coils may be disposed on the second surface 241b. In an embodiment, the first substrate 241 may be disposed such that the opening area 244 of the holder 243 and the image sensor 242 are aligned with each other. In an embodiment, the connecting member 280 may be connected to an edge of the first substrate 241.

In an embodiment, the image sensor 242 may be at least partially aligned with the optical axis L. The image sensor 242 may be electrically connected with the first substrate 241, or may be disposed on the first surface 241a of the first substrate 241. The image sensor 242 may be configured to receive light passing through the lenses and generate an electrical signal based on the received light signal. For example, the image sensor 242 may face the lenses included in the lens unit 212 through the opening area 244 of the holder 243. In an embodiment, the image stabilization assembly 230 may be configured to move the image sensor 242 and the holder 243 in the direction in which the center of the image sensor 242 and the optical axis are aligned with each other.

In an embodiment, the coils may be located on the second surface 241b of the first substrate 241. In an embodiment, the plurality of coils 271, 272, 273, and 274 may include the coils 271 and 272 related to a movement of the image sensor 242 in the Y-axis direction and the coils 273 and 274 related to a movement of the image sensor 242 in the Z-axis direction. For example, the plurality of coils 271, 272, 273, and 274 may include the first coil 271 and the second coil 272 related to the movement of the image sensor 242 in the Y-axis direction and the third coil 273 and the fourth coil 274 related to the movement of the image sensor 242 in the Z-axis direction.

In an embodiment, the image stabilization assembly 230 may perform an image stabilization function by moving the image sensor 242 in a direction perpendicular to the optical axis L (e.g., the Y-axis direction and/or the Z-axis direction) by applying electrical signals to the coils. For example, the coils 271, 272, 273, and 274 may electromagnetically interact with magnets (not illustrated) that are disposed on the fixed frame 231. For example, when the electrical signals are applied to the coils 271, 272, 273, and 274, a magnetic field may be formed, and an electromagnetic force may be generated between the coils 271, 272, 273, and 274 and the magnets. The electromagnetic force may move the moving member 240 coupled to be movable relative to the lens assembly 210 and the fixed frame 231.

In an embodiment, the guide structure (e.g., a guide or a guide member) 250 may be configured to support a movement of the moving member 240. For example, the guide structure 250 may be coupled to the holder 243 and the fixed frame 231 so as to be movable. For example, the guide structure 250 may be coupled to the holder 243 so as to be movable in the Y-axis direction and may be coupled to the fixed frame 231 so as to be movable in the Z-axis direction.

In an embodiment, the guide structure 250 may move together with the moving member 240, or may be fixed, when an image stabilization function is performed. For example, when the moving member 240 moves in the Z-axis direction, the guide structure 250 may move in the Z-axis direction together with the moving member 240. For example, when the moving member 240 moves in the Y-axis direction, the guide structure 250 may be fixed together with the fixed frame 231 and may support the movement of the moving member 240 in the Y-axis direction.

In an embodiment, the guide structure 250 may have a second opening area 253 at least partially aligned with the coils 271, 272, 273, and 274 in the X-axis direction. For example, the coils 271, 272, 273, and 274 may directly face the magnets (e.g., magnets 261, 262, 263, and 264 of FIG. 7) through the second opening area 253.

Figure 18:
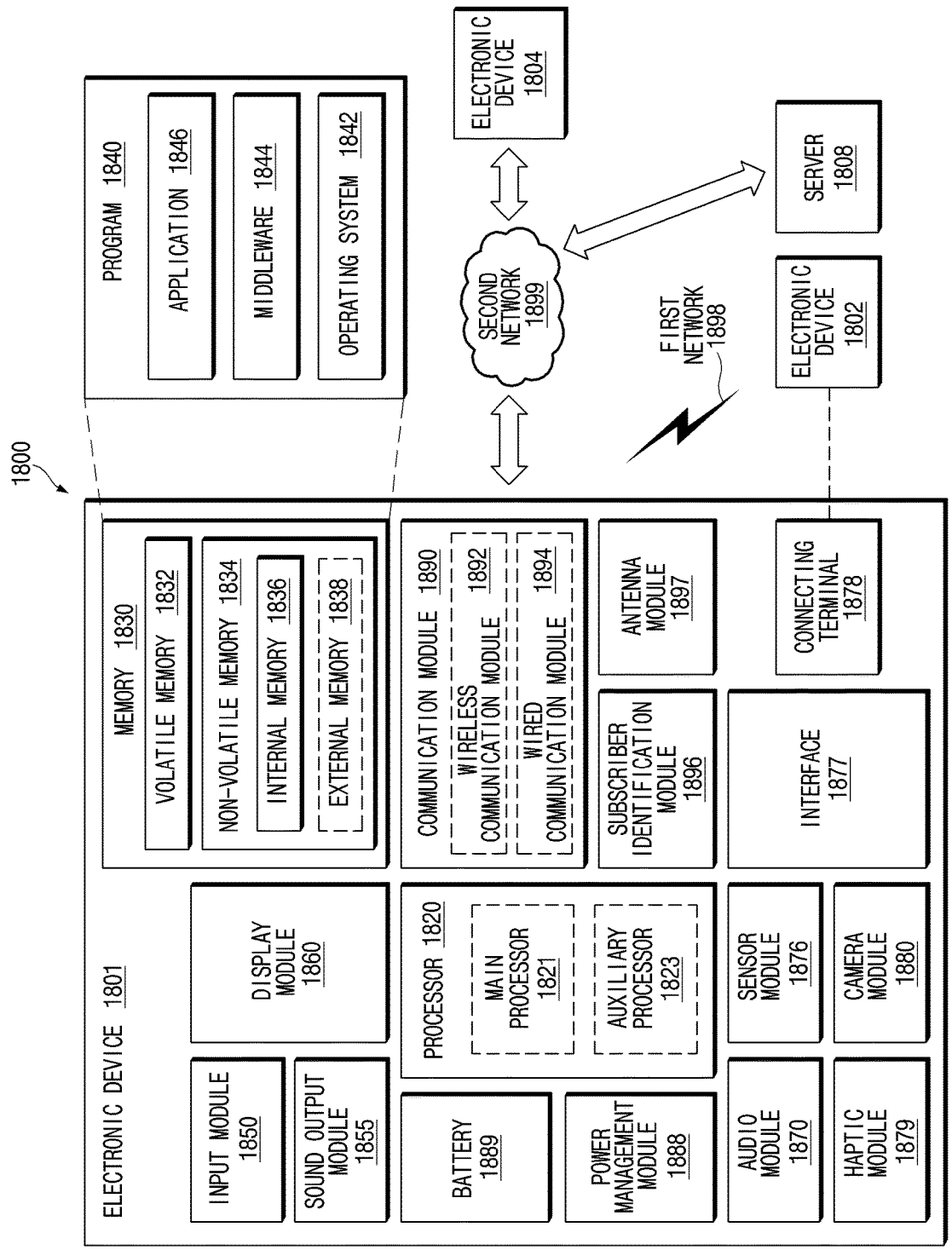
FIG. 18 is a block diagram illustrating an electronic device in a network environment according to various embodiments.

In an embodiment, the connecting member 280 may be connected to the first substrate 241 and may transmit an electrical signal related to an image generated by the image sensor to the processor of the electronic device (e.g., a processor 1820 of FIG. 18). For example, the connecting member 280 may include a second substrate 281 and a third substrate 283. At least a portion of the second substrate 281 may be located on a side surface of the camera housing 211. The second substrate 281 may be flexibly connected to the first substrate 241. A connector 285 may be disposed on, or connected to, the third substrate 283. In an embodiment, the connecting member 280 may include a first connecting portion 282 that connects the first substrate 241 and the second substrate 281. The connecting member 280 may include a second connecting portion 284 that connects the second substrate 281 and the third substrate 283. In an embodiment, when the moving member 240 moves, the second substrate 281 may move together depending on a movement of the first substrate 241, and the shape of the first connecting portion 282 may be deformed depending on the movement of the first substrate 241. In an embodiment, when the moving member 240 moves, the shape of the second connecting portion 284 may be deformed depending on the movement of the second substrate 281. In an embodiment, the third substrate 283 may be fixedly disposed in the housing of the electronic device 100 (e.g., the first support member 142 of FIG. 3). A movement of the connecting member 280 when an image stabilization function is performed will be described in greater detail below with reference to FIGS. 11 and 12.

In various embodiments, the plurality of substrates included in the connecting member 280 may be implemented with one substrate or two or more substrates connected together. For example, the connecting member 280 may be implemented with one rigid-flexible printed circuit board (RFPCB) that includes a rigid area (e.g., the second substrate 281 and the third substrate 283) and a flexible area (e.g., the first connecting portion 282 and the second connecting portion 284).

In various embodiments, the first substrate 241, on which the image sensor 242 is disposed, may be integrally formed with at least a portion (e.g., the second substrate 281 and the first connecting portion 282) of the connecting member 280.

Figure 7:
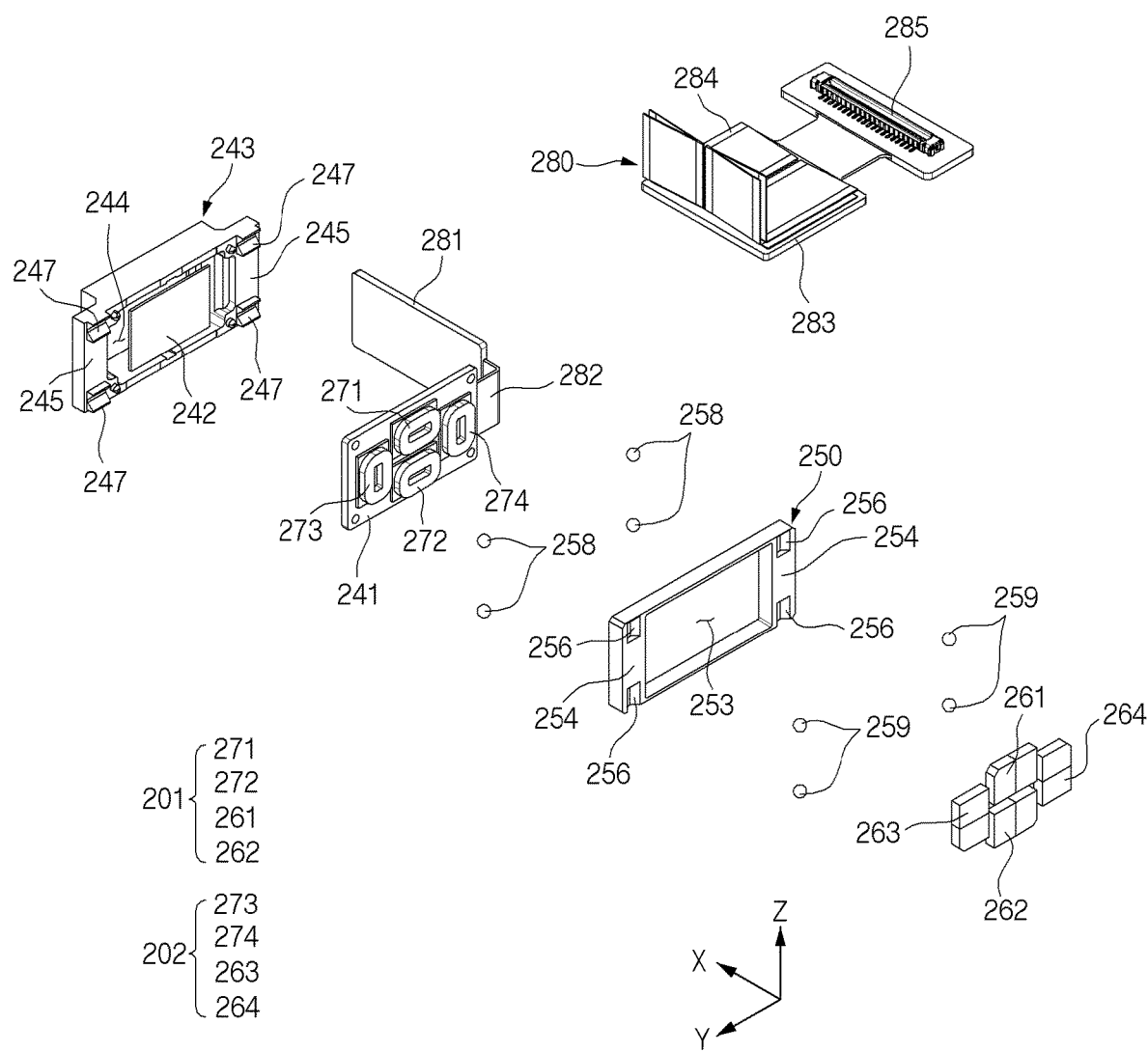
FIG. 7 is an exploded perspective view illustrating the moving member, a guide structure, and drive units of the image stabilization assembly according to various embodiments.
Figure 8:
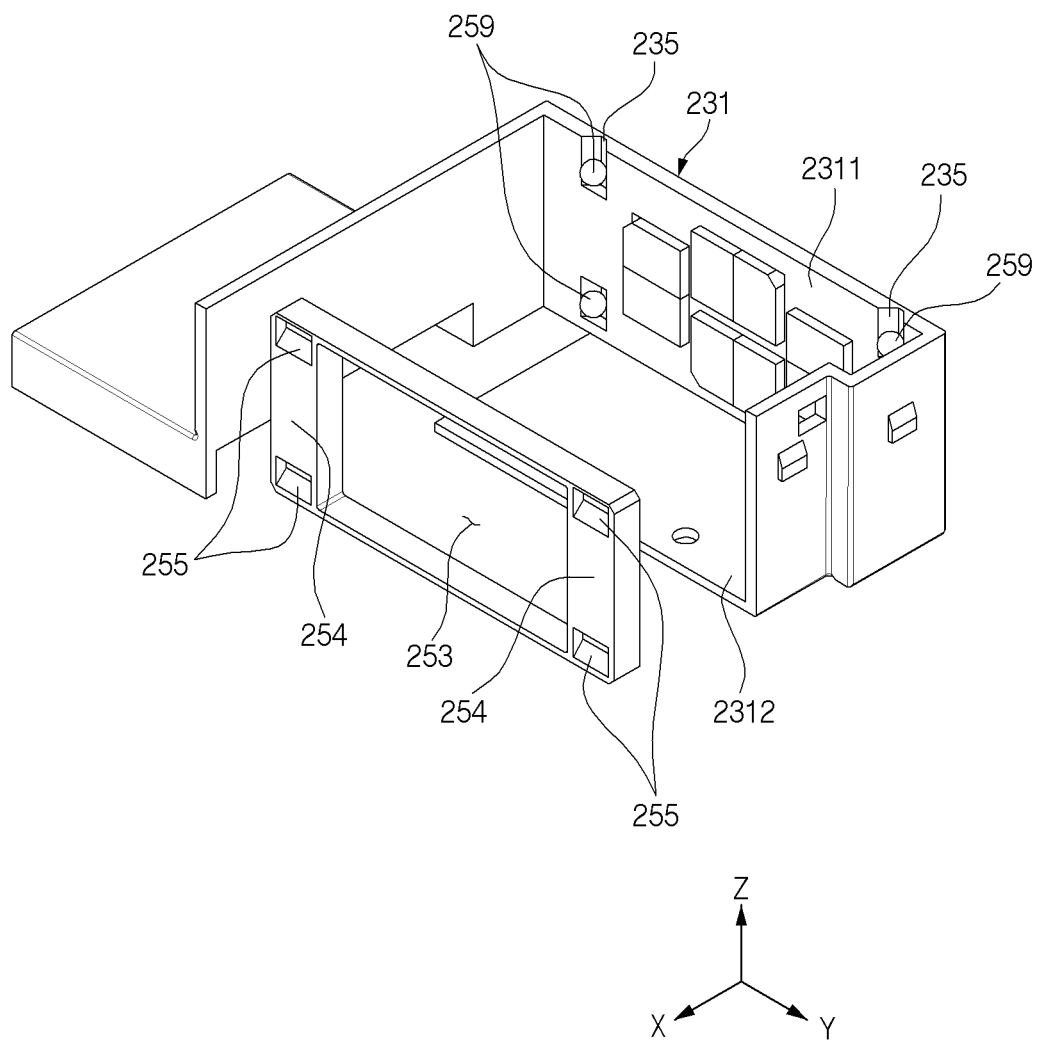
FIG. 8 is a perspective view illustrating a coupling of the guide structure and a fixed frame of the image stabilization assembly according to various embodiments.
Figure 9A:
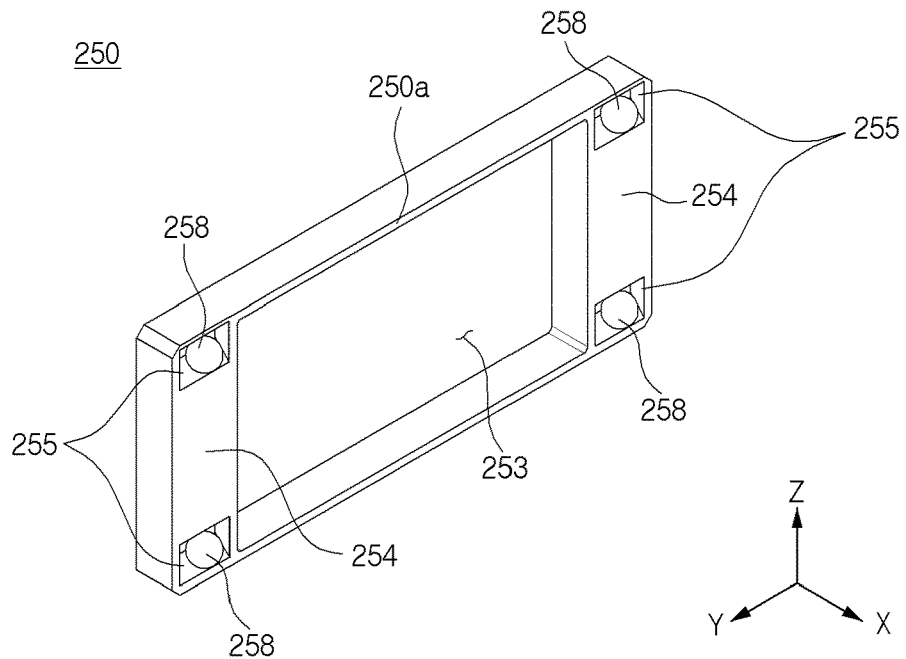
FIGS. 9A and 9B are perspective views illustrating the guide structure of the image stabilization assembly according to various embodiments.
Figure 9B:
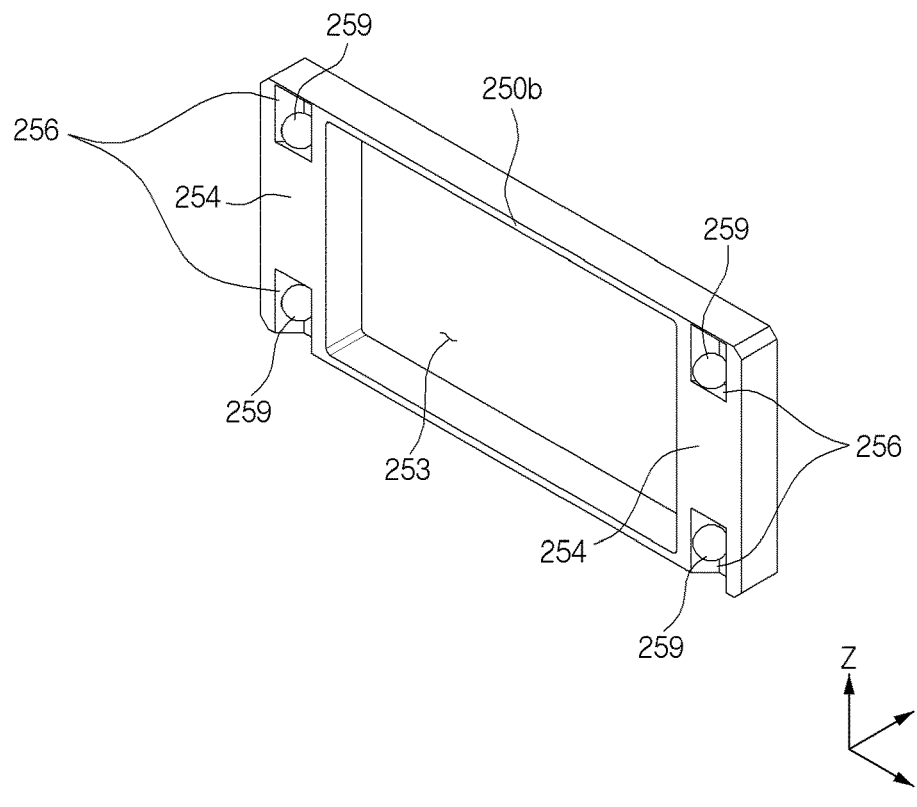

FIG. 7 is an exploded perspective view illustrating the moving member, the guide structure, and drive units of the image stabilization assembly according to various embodiments. FIG. 8 is a perspective view illustrating a coupling of the guide structure and the fixed frame of the image stabilization assembly according to various embodiments. FIGS. 9A and 9B are perspective views illustrating the guide structure of the image stabilization assembly according to various embodiments.

In an embodiment, the moving member 240 may include the holder 243, the first substrate 241, the image sensor 242, and the coils 271, 272, 273, and 274. The moving member 240 may be configured to move in at least two directions substantially perpendicular to the direction of the optical axis (e.g., the X-axis direction) when an image stabilization function is performed. The at least two directions may be directions perpendicular to each other. For example, the moving member 240 may move in the Y-axis direction and/or the Z-axis direction.

Referring to FIG. 8, the fixed frame 231 may include a sidewall 2311 having the magnets 261, 262, 263, and 264 disposed thereon and a bottom surface 2312 extending from the sidewall 2311 in a direction substantially perpendicular to the sidewall 2311 (e.g., the X-axis direction). The bottom surface 2312 may support the guide structure 250 in the Z-axis direction. At least a portion of the camera housing (e.g., the camera housing 211 of FIG. 5) of the lens assembly (e.g., the lens assembly 210 of FIG. 5) may be located on the bottom surface 2312.

In an embodiment, the image stabilization assembly 230 may include the drive units 201 and 202. The drive units 201 and 202 may include one or more coils 271, 272, 273, and 274 and one or more magnets 261, 262, 263, and 264. The one or more coils 271, 272, 273, and 274 may be disposed on the first substrate 241. The one or more magnets 261, 262, 263, and 264 may be disposed on the sidewall 2311 of the fixed frame 231. In an embodiment, the coils and the magnets may be disposed to at least partially overlap each other when viewed in the direction of the optical axis (e.g., the X-axis direction).

In an embodiment, the drive units 201 and 202 may include the first drive unit 201 related to a movement of the moving member 240 in the Y-axis direction and the second drive unit 202 related to a movement of the moving member in the Z-axis direction.

In an embodiment, the first drive unit 201 may include the first coil 271, the second coil 272, the first magnet 261, and the second magnet 262. The first coil 271 and the second coil 272 may be disposed on the second surface 241b of the first substrate 241, and the first magnet 261 and the second magnet 262 may be disposed on the sidewall 2311 of the fixed frame 231. In an embodiment, the first coil 271 and the first magnet 261 may be disposed to at least partially overlap each other when viewed in the direction of the optical axis (e.g., the X-axis direction). The second coil 272 and the second magnet 262 may be disposed to at least partially overlap each other when viewed in the direction of the optical axis (e.g., the X-axis direction).

In an embodiment, electrical signals may be applied to the first coil 271 and the second coil 272. The electrical signals may be applied through the connecting member 280 and the first substrate 241.

In an embodiment, the first coil 271 and the second coil 272 may be arranged in the Z-axis direction. For example, the first coil 271 may be located in the +Z-axis direction with respect to the second coil 272. In various embodiments, the first coil 271 and the second coil 272 may have a shape longer in the Y-axis direction than in the Z-axis direction. In an embodiment, each of the first coil 271 and the second coil 272 may include a conductive wire surrounding any axis parallel to the optical axis (e.g., an axis parallel to the X-axis direction), or may include a conductive pattern formed in a direction surrounding any axis parallel to the optical axis (e.g., an axis parallel to the X-axis direction). For example, the first coil 271 and the second coil 272 may be formed such that a conductive wire or a conductive pattern that extends in the Y-axis direction is longer than a conductive wire or a conductive pattern that extends in the Z-axis direction.

In an embodiment, the first magnet 261 and the second magnet 262 may be arranged in the Z-axis direction. For example, the first magnet 261 may be located in the +Z-axis direction with respect to the second magnet 262. In an embodiment, the first magnet 261 may be formed such that the facing surface of the first magnet 261 that faces the first coil 271 includes at least two polarities. In an embodiment, the second magnet 262 may be formed such that the facing surface of the second magnet 262 that faces the second coil 272 includes at least two polarities. For example, the facing surface of each of the first magnet 261 and the second magnet 262 may include an N-pole area and an S-pole area. In an embodiment, the first magnet 261 may be formed such that the N-pole area and the S-pole area are arranged in the Y-axis direction. For example, the N-pole area of the first magnet 261 may be located in the Y-axis direction with respect to the S-pole area. In an embodiment, the second magnet 262 may be formed such that the N-pole area and the S-pole area are arranged in the Y-axis direction. For example, the N-pole area of the second magnet 262 may be located in the Y-axis direction with respect to the S-pole area.

In an embodiment, the first magnet 261 may be configured such that the N-pole area and the S-pole area at least partially overlap the first coil 271 when viewed in the direction of the optical axis (e.g., the X-axis direction). In an embodiment, the second magnet 262 may be configured such that the N-pole area and the S-pole area at least partially overlap the second coil 272 when viewed in the direction of the optical axis (e.g., the X-axis direction).

In an embodiment, the guide structure 250 may be located between the holder 243 of the moving member 240 and the sidewall 2311 of the fixed frame 231. The guide structure 250 may be coupled to the holder 243 and the sidewall 2311 so as to be movable. For example, the guide structure 250 may be coupled to the holder 243 so as to be movable in the Y-axis direction and may be coupled to the sidewall 2311 of the fixed frame 231 so as to be movable in the Z-axis direction.

In an embodiment, the image stabilization assembly 230 may further include a first ball guide structure and a second ball guide structure.

In an embodiment, the first ball guide structure may include one or more first balls 258 disposed between the guide structure 250 and the holder 243 of the moving member 240. For example, a plurality of first balls 258 may be formed. The holder 243 may include the opening area 244 in which the image sensor 242 is located and a peripheral area 245 around the opening area 244. In this case, the plurality of first balls 258 may at least partially make contact with the peripheral area 245.

In an embodiment, the holder 243 may have, on the peripheral area 245 thereof, first recesses 247 in which at least portions of the first balls 258 are accommodated. As many first recesses 247 as the first balls 258 may be formed. For example, the first recesses 247 may be formed in a shape extending in the Y-axis direction. In an embodiment, the guide structure 250 may have second recesses 255 overlapping the first recesses 247 in the direction of the optical axis (e.g., the X-axis direction). The second recesses 255, together with the first recesses 247, may form spaces in which the first balls 258 are accommodated. For example, the second recesses 255 may be formed in a shape extending in the Y-axis direction. As many second recesses 255 as the first balls 258 may be formed.

In an embodiment, the first balls 258 may be configured to roll in the spaces between the first recesses 247 and the second recesses 255. The first balls 258 may rotate in specified positions within the spaces, or may rotate while linearly moving. For example, when the holder 243 moves in the Y-axis direction, the first balls 258 may rotate while linearly moving in the Y-axis direction in the spaces between the first recesses 247 and the second recesses 255, or may rotate in position in the spaces between the first recesses 247 and the second recesses 255.

In an embodiment, the second ball guide structure may include one or more second balls 259 disposed between the guide structure 250 and the sidewall 2311 of the fixed frame 231. For example, a plurality of second balls 259 may be formed. The guide structure 250 may include the second opening area 253 in which the coils 271, 272, 273, and 274 are located or through which the coils 271, 272, 273, and 274 are exposed, and a second peripheral area 254 around the second opening area 253. In this case, the plurality of second balls 259 may at least partially make contact with the second peripheral area 254.

In an embodiment, the guide structure 250 may have, on the second peripheral area 254 thereof, third recesses 256 in which at least portions of the second balls 259 are accommodated. As many third recesses 256 as the second balls 259 may be formed. For example, the third recesses 256 may be formed in a shape extending in the Z-axis direction. In an embodiment, the fixed frame 231 may have, on the sidewall 2311 thereof, fourth recesses 235 overlapping the third recesses 256 in the direction of the optical axis (e.g., the X-axis direction). The fourth recesses 235, together with the third recesses 256, may form spaces in which the second balls 259 are accommodated. For example, the fourth recesses 235 may be formed in a shape extending in the Z-axis direction. As many fourth recesses 235 as the second balls 259 may be formed.

In an embodiment, the second balls 259 may be configured to roll in the spaces between the third recesses 256 and the fourth recesses 235. The second balls 259 may rotate in specified positions within the spaces, or may rotate while linearly moving. For example, when the guide structure 250 moves in the Z-axis direction together with the holder 243, the second balls 259 may rotate while linearly moving in the Z-axis direction in the spaces between the third recesses 256 and the fourth recesses 235, or may rotate in position in the spaces between the third recesses 256 and the fourth recesses 235.

Referring to FIGS. 8, 9A and 9B, the guide structure 250 may include a third surface 250a at least partially making contact with the peripheral area 245 of the holder 243 through the first balls 258 and a fourth surface 250b at least partially making contact with the sidewall 2311 through the second balls 259. The guide structure 250 may have the second opening area 253 formed therein through which the second surface 241b of the first substrate 241 is exposed, and the second opening area 253 may penetrate the third surface 250a and the fourth surface 250b. The coils 271, 272, 273, and 274 located on the second surface 241b of the first substrate 241 may face the magnets 261, 262, 263, and 264, which are located on the sidewall 2311 of the fixed frame 231, in the direction of the optical axis through the second opening area 253.

Figure 10A:
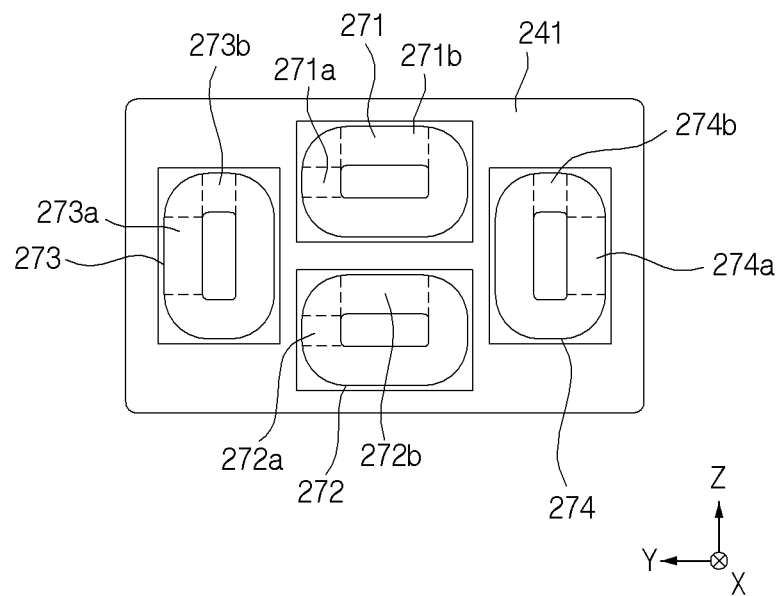
FIGS. 10A and 10B are diagrams illustrating an arrangement of magnets and coils of the image stabilization assembly according to various embodiments.
Figure 10B:
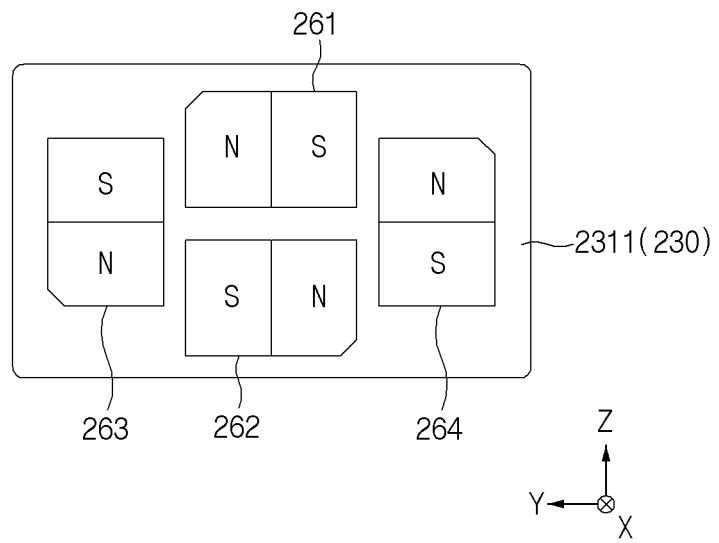

FIGS. 10A and 10B are diagrams illustrating an arrangement of the magnets and the coils of the image stabilization assembly according to various embodiments.

In an embodiment, the first drive unit 201 may be configured to move the first substrate 241 in the Y-axis direction. The first drive unit 201 may include the first coil 271, the second coil 272, the first magnet 261, and the second magnet 262.

Referring to FIGS. 10A and 10B, the first magnet 261 may at least partially face the first coil 271 when viewed in the direction of the optical axis. In this case, a first facing surface that faces the first coil 271 may be defined on the first magnet 261. The first facing surface may include at least one N-pole area and at least one S-pole area. The first magnet 261 may be formed such that the N-pole area and the S-pole area are arranged in the Y-axis direction.

Referring to FIGS. 10A and 10B, the first coil 271 may be formed such that a portion 271b extending in the Y-axis direction is longer than a portion 271a extending in the Z-axis direction. The first coil 271 may include a conductive wire wound around an axis parallel to the optical axis or a conductive pattern printed in the clockwise or counterclockwise direction around an axis parallel to the optical axis. For example, an electric current may flow through the first coil 271 in the clockwise or counterclockwise direction.

Referring to FIGS. 10A and 10B, the second magnet 262 may at least partially face the second coil 272 when viewed in the direction of the optical axis. In this case, a second facing surface that faces the second coil 272 may be defined on the second magnet 262. The second facing surface may include at least one N-pole area and at least one S-pole area. The second magnet 262 may be formed such that the N-pole area and the S-pole area are arranged in the Y-axis direction.

Referring to FIGS. 10A and 10B, the second coil 272 may be formed such that a portion 272b extending in the Y-axis direction is longer than a portion 272a extending in the Z-axis direction. The second coil 272 may include a conductive wire wound around an axis parallel to the optical axis or a conductive pattern printed in the clockwise or counterclockwise direction around an axis parallel to the optical axis. For example, an electric current may flow through the second coil 272 in the clockwise or counterclockwise direction.

In an embodiment, the second drive unit 202 may be configured to move the first substrate 241 in the Z-axis direction. The second drive unit 202 may include the third coil 273, the fourth coil 274, the third magnet 263, and the fourth magnet 264.

Referring to FIGS. 10A and 10B, the third magnet 263 may at least partially face the third coil 273 when viewed in the direction of the optical axis. In this case, a third facing surface that faces the third coil 273 may be defined on the third magnet 263. The third facing surface may include at least one N-pole area and at least one S-pole area. The third magnet 263 may be formed such that the N-pole area and the S-pole area are arranged in the Z-axis direction.

Referring to FIGS. 10A and 10B, the third coil 273 may be formed such that a portion 273a extending in the Z-axis direction is longer than a portion 273b extending in the Y-axis direction. The third coil 273 may include a conductive wire wound around an axis parallel to the optical axis or a conductive pattern printed in the clockwise or counterclockwise direction around an axis parallel to the optical axis. For example, an electric current may flow through the third coil 273 in the clockwise or counterclockwise direction.

Referring to FIGS. 10A and 10B, the fourth magnet 264 may at least partially face the fourth coil when viewed in the direction of the optical axis. In this case, a fourth facing surface that faces the fourth coil 274 may be defined on the fourth magnet 264. The fourth facing surface may include at least one N-pole area and at least one S-pole area. The fourth magnet 264 may be formed such that the N-pole area and the S-pole area are arranged in the Z-axis direction.

Referring to FIGS. 10A and 10B, the fourth coil 274 may be formed such that a portion 274a extending in the Z-axis direction is longer than a portion 274b extending in the Y-axis direction. The fourth coil 274 may include a conductive wire wound around an axis parallel to the optical axis or a conductive pattern printed in the clockwise or counterclockwise direction around an axis parallel to the optical axis. For example, an electric current may flow through the fourth coil 274 in the clockwise or counterclockwise direction.

In an embodiment, the first substrate 241 may be formed in a rectangular shape in which the horizontal and vertical lengths are substantially different from each other. For example, the first substrate 241 may be formed such that the edges extending in the Y-axis direction are longer than the edges extending in the Z-axis direction. In an embodiment, the coils 271, 272, 273, and 274 may be disposed such that the coils 271 and 272 that are long in the Y-axis direction are arranged in the Z-axis direction and the coils 273 and 274 that are long in the Z-axis direction are arranged in the Y-axis direction. Through the above-described structure, the coil mounting area of the first substrate 241 may be efficiently used.

According to a comparative example, when coils long in the Y-axis direction are arranged in the Y-axis direction and coils long in the Z-axis direction are arranged in the Z-axis direction, a first substrate extending longer in the Y-axis direction than in the Z-axis direction may be required. This may lead to an increase in the overall sizes of the image stabilization assembly 230 and the camera module 200.

Referring to FIGS. 10A and 10B, although it has been illustrated by way of example that the coils 271, 272, 273, and 274 are located on the first substrate 241 and the magnets 261, 262, 263, and 264 are located on the sidewall 2311 of the fixed frame 231, the disclosure is not necessarily limited thereto. For example, the image stabilization assembly 230 according to various embodiments may be configured such that the coils are located on the sidewall 2311 of the fixed frame 231 and the magnets are located on the moving member (e.g., the first substrate 241 or the holder 243). In this case, the camera module 200 and/or the image stabilization assembly 230 may further include a separate additional connecting member for applying electrical signals to the coils located on the sidewall 2311 of the fixed frame 231.

Figure 11A:
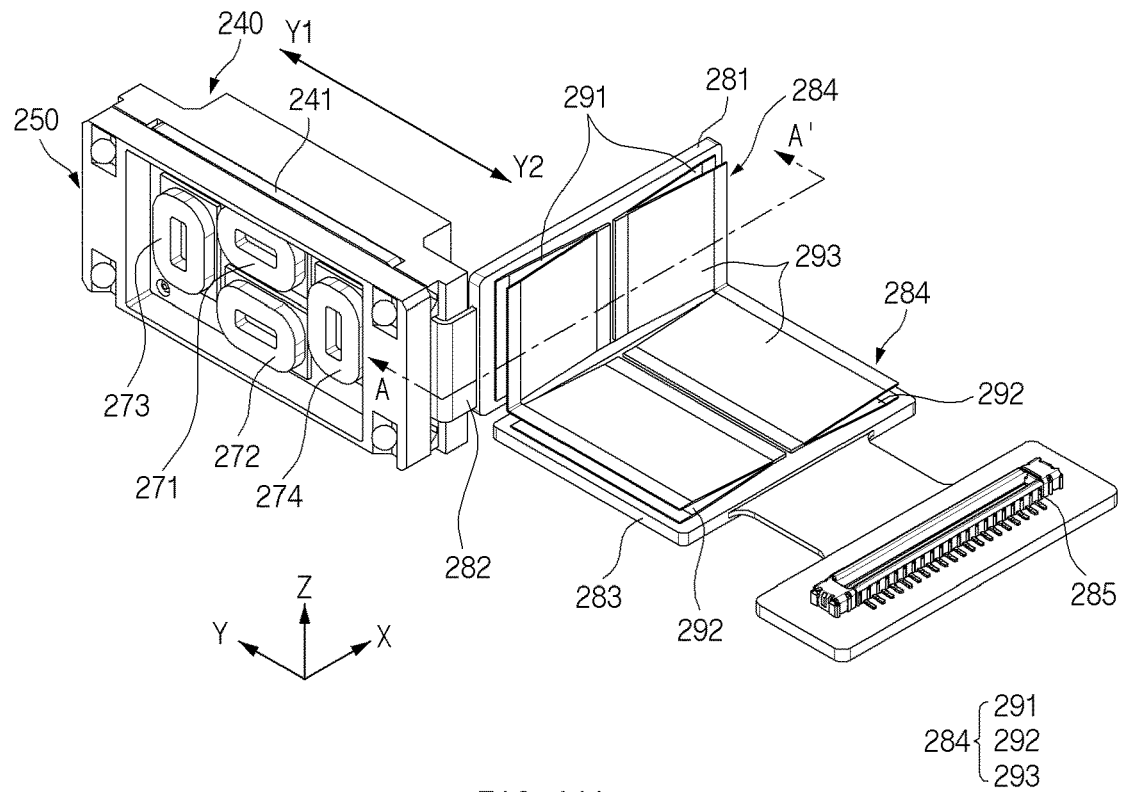
FIGS. 11A and 11B include a perspective view and a diagram illustrating example operations of the moving member and a connecting member of the image stabilization assembly according to various embodiments.
Figure 11B:
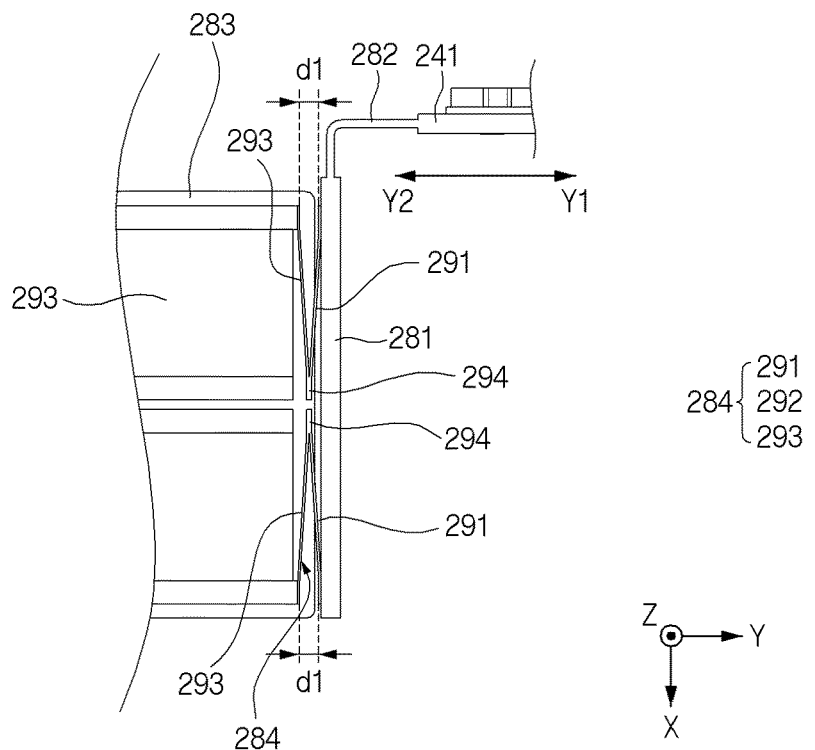
Figure 12A:
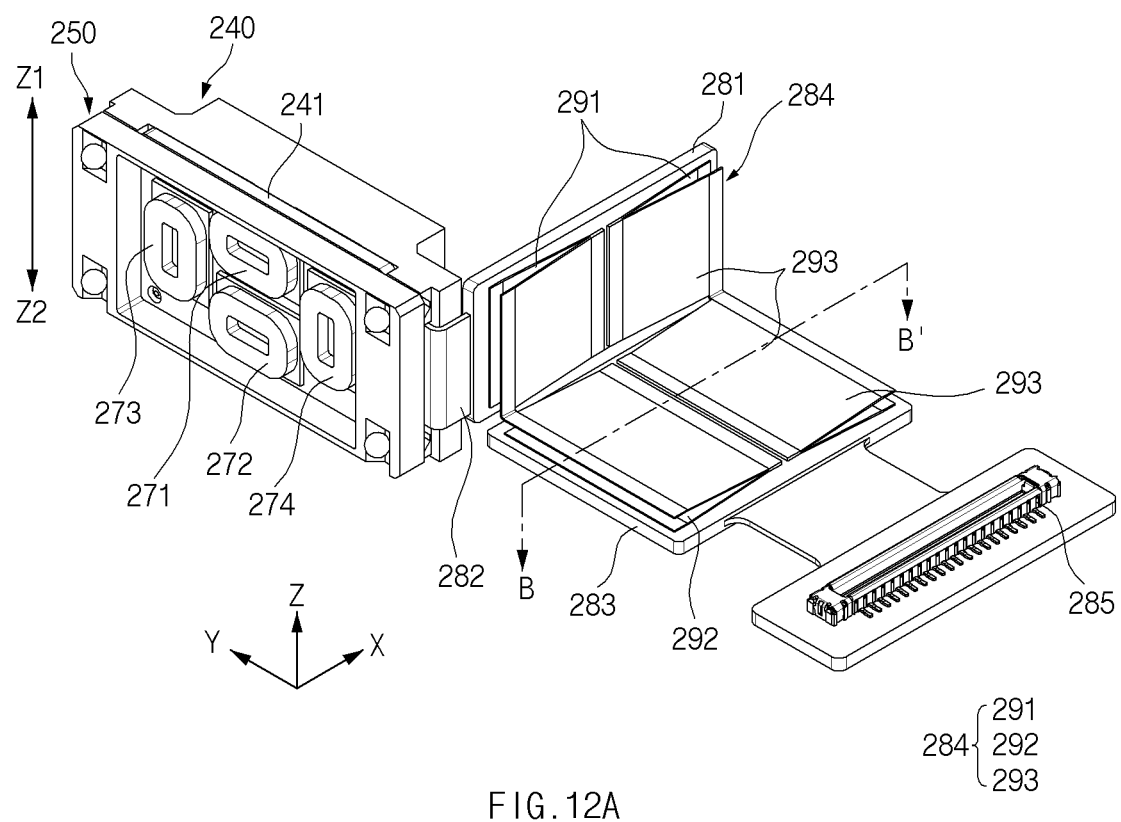
FIGS. 12A and 12B include a perspective view and diagram illustrating example operations of the moving member and the connecting member of the image stabilization assembly according to various embodiments.
Figure 12B:
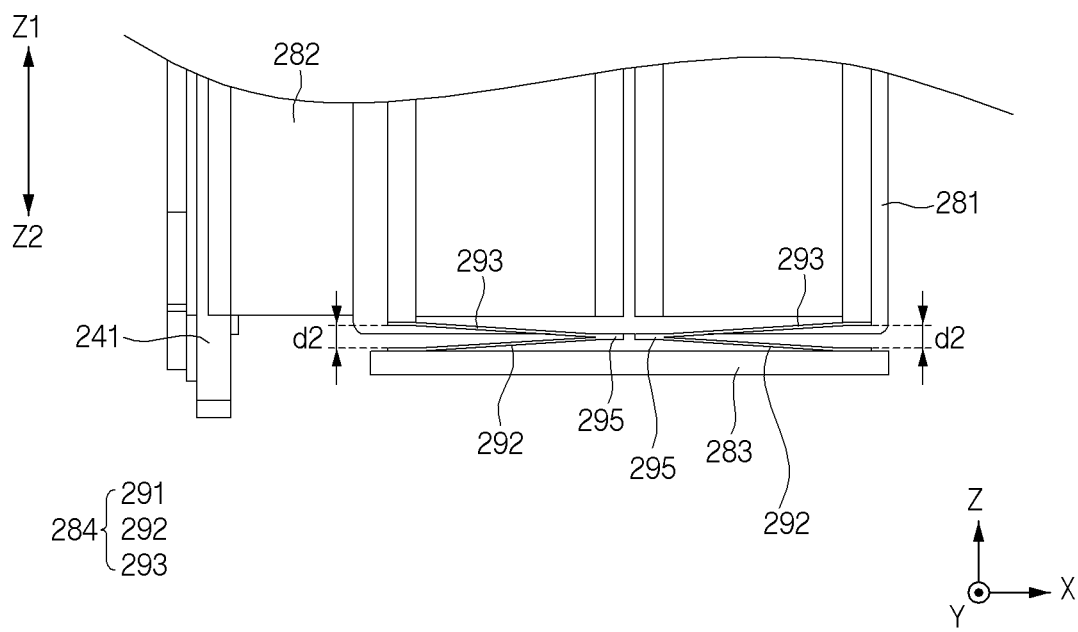

FIGS. 11A and 11B are a perspective view and a diagram illustrating example operations of the moving member and the connecting member of the image stabilization assembly according to various embodiments. FIG. 11A is a perspective view illustrating the moving member and the connecting member, and FIG. 11B is a sectional view taken along line A-A' illustrated in FIG. 11A. FIGS. 12A and 12B are a perspective view and diagram illustrating example operations of the moving member and the connecting member of the image stabilization assembly according to various embodiments. FIG. 12A is a perspective view illustrating the moving member and the connecting member, and FIG. 12B is a sectional view taken along line B-B' illustrated in FIG. 12A.

In an embodiment, the image sensor 242 may be disposed on the first substrate 241 included in the moving member 240, and the connecting member 280 may be connected to one side of the first substrate 241. The connecting member 280 may include the connector 285, and the connector 285 may be fixedly coupled to a printed circuit board (e.g., the printed circuit board 150 of FIG. 3) of the electronic device 100. For example, when the moving member 240 moves, tension by the connecting member 280 may be applied to the first substrate 241. The tension may obstruct the movement of the first substrate 241 and the moving member 240. According to various embodiments, the connecting member 280 may include the first connecting portion 282 and the second connecting portion 284 whose shapes are deformable. For example, the shapes of the first connecting portion 282 and the second connecting portion 284 of the connecting member 280 may be deformed in response to the movement of the first substrate 241.

In an embodiment, the connecting member 280 may include the second substrate 281, the third substrate 283, the first connecting portion 282, and the second connecting portion 284. For example, the first connecting portion 282 may flexibly connect the first substrate 241 and the second substrate 281. The second connecting portion 284 may flexibly connect the second substrate 281 and the third substrate 283. For example, in a state in which an image stabilization operation is not performed, the second substrate 281 may be disposed to form a substantially 90 degrees with the first substrate 241. For example, in the state in which the image stabilization operation is not performed, the third substrate 283 may be disposed to form a substantially 90 degrees with the first substrate 241 and the second substrate 281.

Referring to FIGS. 11A, 11B, 12A and 12B, the second connecting portion 284 may include a first layer 291, a second layer 292, and a third layer 293. In an embodiment, the third layer 293 may be bent such that one partial area at least partially faces the second substrate 281 and another partial area at least partially faces the third substrate 283.

In an embodiment, at least one portion of the first layer 291 may make contact with the second substrate 281, and another portion of the first layer 291 may make contact with the third layer 293. For example, a partial area of the first layer 291 may be surface mounted on the second substrate 281, and thus the first layer 291 and the second substrate 281 may be electrically connected with each other. For example, the first layer 291 and the third layer 293 may be electrically connected through a first VIA area 294 having one or more VIAs formed therein.

In an embodiment, at least one portion of the second layer 292 may make contact with the third substrate 283, and another portion of the second layer 292 may make contact with the third layer 293. For example, a partial area of the second layer 292 may be surface mounted on the third substrate 283, and thus the second layer 292 and the third substrate 283 may be electrically connected with each other. For example, the second layer 292 and the third layer 293 may be electrically connected through a second VIA area 295 having one or more VIAs formed therein.

Referring to FIGS. 11A and 11B, in an embodiment, the first layer 291 and the second layer 292, when viewed in the Y-axis direction, may be at least partially spaced apart from each other by a predetermined (e.g., specified) gap d1. The predetermined (e.g., specified) gap d1 may be increased or decreased when the moving member moves in the Y-axis direction.

Referring to FIGS. 11A and 11B, the image stabilization assembly 230 may be configured to linearly move the moving member 240 in the Y-axis direction using the first coil 271 and the second coil 272. In an embodiment, the moving member 240 may include the holder 243, the first substrate 241, and the image sensor 242, and the image stabilization assembly 230 may move the image sensor 242 to align the optical axis L of the lens assembly 210 illustrated in FIG. 4 with a specified position on the image sensor 242.

In an embodiment, when the image stabilization assembly 230 performs a Y-axis image stabilization operation, the guide structure 250 may be fixed in a specified position, and the holder 243, the first substrate 241, and the image sensor 242 disposed on the first substrate 241 may move in the Y-axis direction.

Referring to FIGS. 11A and 11B, when the moving member 240 moves in a Y1 direction, the second substrate 281 connected to the first substrate 241 through the first connecting portion 282 may move in the Y1 direction. For example, the first layer 291 of the second connecting portion 284 may move in the Y1 direction together with the second substrate 281, and the gap d1 between the first layer 291 and the third layer 293 may be increased.

Referring to FIGS. 11A and 11B, when the moving member 240 moves in a Y2 direction, the second substrate 281 connected to the first substrate 241 through the first connecting portion 282 may move in the Y2 direction. For example, the first layer 291 of the second connecting portion 284 may move in the Y2 direction together with the second substrate 281, and the gap d1 between the first layer 291 and the third layer 293 may be decreased.

Referring to FIGS. 12A and 12B, in an embodiment, the second layer 292 and the third layer 293, when viewed in the Z-axis direction, may be at least partially spaced apart from each other by a predetermined (e.g. specified) gap d2. The predetermined (e.g., specified) gap d2 may be increased or decreased when the moving member 240 moves in the Z-axis direction.

Referring to FIGS. 12A and 12B, the image stabilization assembly 230 may be configured to linearly move the moving member 240 in the Z-axis direction using the third coil 273 and the fourth coil 274. In an embodiment, the moving member 240 may include the holder 243, the first substrate 241, and the image sensor 242, and the image stabilization assembly 230 may move the image sensor 242 to align the optical axis L of the lens assembly 210 with a specified position on the image sensor 242.

In an embodiment, when the image stabilization assembly 230 performs a Z-axis image stabilization operation, the moving member (the holder 243, the first substrate 241, and the image sensor 242 disposed on the first substrate 241) may move in the Z-axis direction together with the guide structure 250.

Referring to FIGS. 12A and 12B, when the moving member 240 moves in a Z1 direction, the second substrate 281 connected to the first substrate 241 through the first connecting portion 282 may move in the Z1 direction. For example, the first layer 291 of the second connecting portion 284 may move in the Z1 direction together with the second substrate 281, and the gap d2 between the second layer 292 and the third layer 293 may be increased.

Referring to FIGS. 12A and 12B, when the moving member 240 moves in a Z2 direction, the second substrate 281 connected to the first substrate 241 through the first connecting portion 282 may move in the Z2 direction. For example, the first layer 291 of the second connecting portion 284 may move in the Z2 direction together with the second substrate 281, and the gap d2 between the second layer 292 and the third layer 293 may be decreased.

Figure 13:
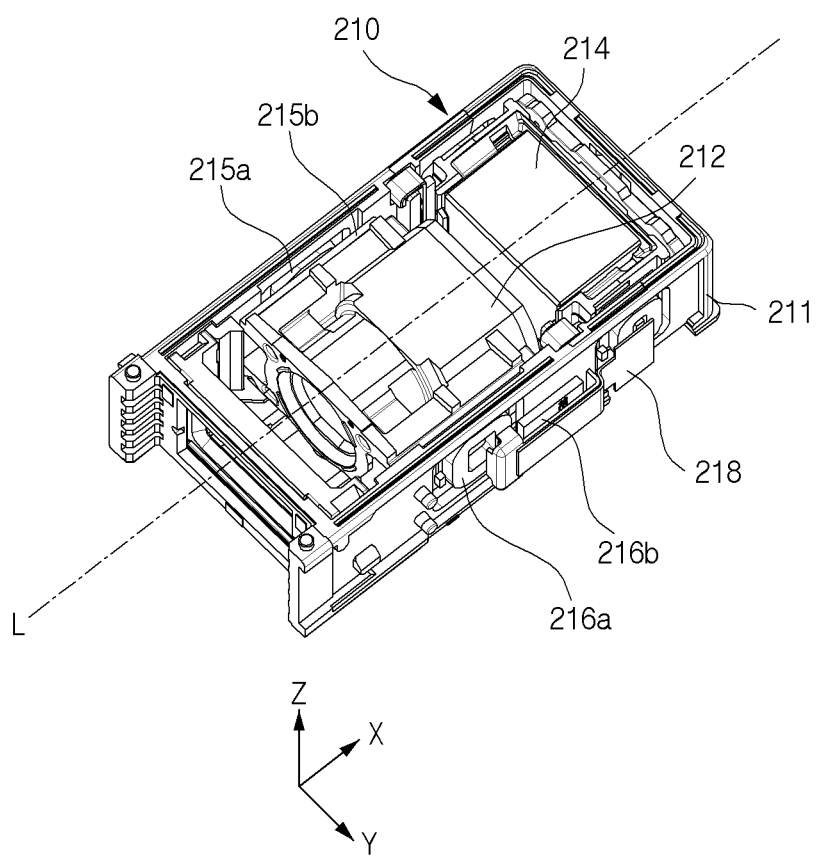
FIG. 13 is a perspective view illustrating the inside of the lens assembly of the camera module according to various embodiments.

FIG. 13 is a perspective view illustrating the inside of the lens assembly of the camera module according to various embodiments.

Referring to FIG. 13, the lens assembly 210 may include the lens unit 212 and the focus drive unit for moving the lens unit 212 in the direction of the optical axis L. The focus drive unit may be configured to move the lens unit 212 in the direction of the optical axis (e.g., the X-axis direction) and may adjust a focus by changing the distance between an image sensor (e.g., the image sensor 242 of FIG. 5) and the lens unit 212.

In an embodiment, the focus drive unit may include a fifth magnet 215b, a sixth magnet 216b, a fifth coil 215a, and a sixth coil 216a. The fifth magnet 215b may be configured to electromagnetically interact with the fifth coil 215a to which an electric current is applied. The sixth magnet 216b may be configured to electromagnetically interact with the sixth coil 216a to which an electric current is applied.

In an embodiment, the fifth magnet 215b and the sixth magnet 216b may be disposed on the lens unit 212. For example, the fifth magnet 215b may be disposed on one side with respect to the optical axis L (on the left side based on the drawing), and the sixth magnet 216b may be disposed on an opposite side with respect to the optical axis L (on the right side based on the drawing). In an embodiment, the fifth coil 215a may be disposed in a first side surface of the camera housing 211 so as to at least partially face the fifth magnet 215b. The sixth coil 216a may be disposed in a second side surface of the camera housing 211 so as to at least partially face the sixth magnet 216b. For example, the fifth coil 215a may be disposed in a first opening area formed in the first side surface of the camera housing 211.

For example, the sixth coil 216a may be disposed in a second opening area formed in the second side surface of the camera housing 211.

In an embodiment, the fifth coil 215a and the sixth coil 216a may receive power through a second connecting member 218. The second connecting member 218 may be disposed on a side surface of the camera housing 211. The second connecting member 218 may be connected to a connecting member (e.g., the connecting member 280 of FIG. 5) along the side surface of the camera housing 211. In various embodiments, control circuitry for controlling electric currents applied to the fifth coil 215a and the sixth coil 216a may be disposed on the second connecting member 218.

Figure 14A:
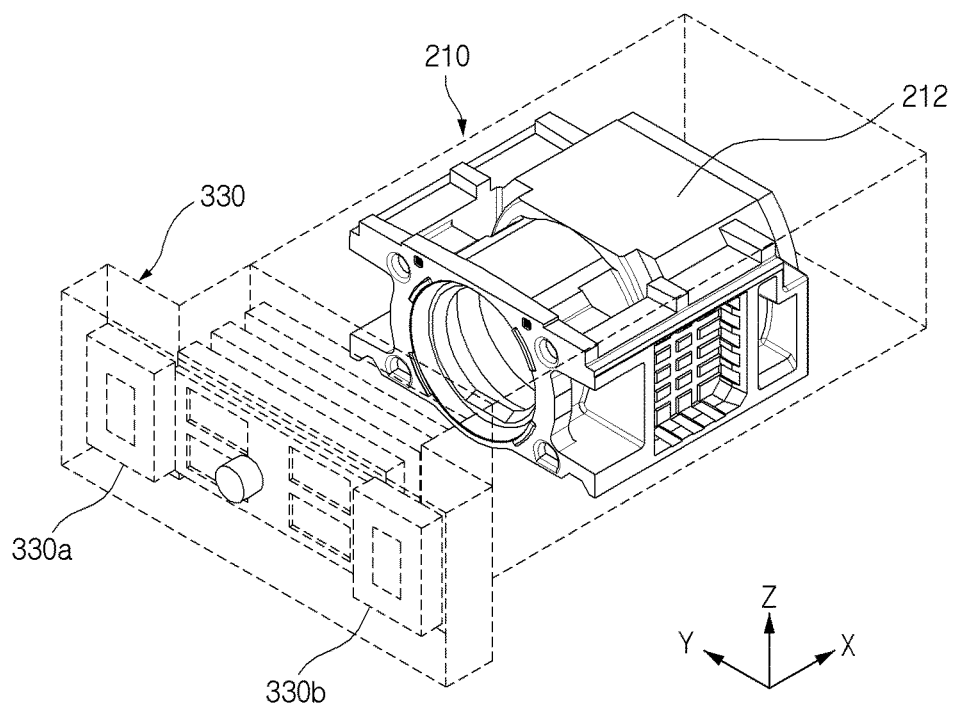
FIGS. 14A and 14B are perspective views illustrating a camera module and an image stabilization assembly according to various embodiments.
Figure 14B:
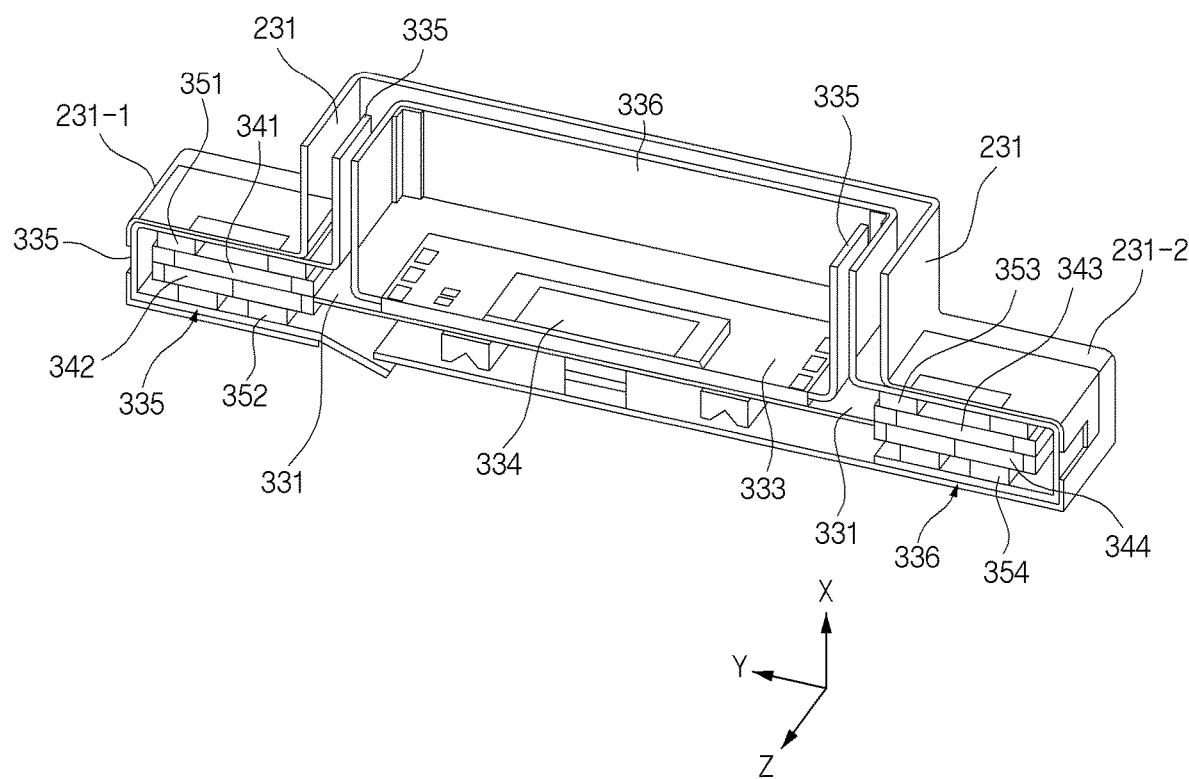
Figure 15:
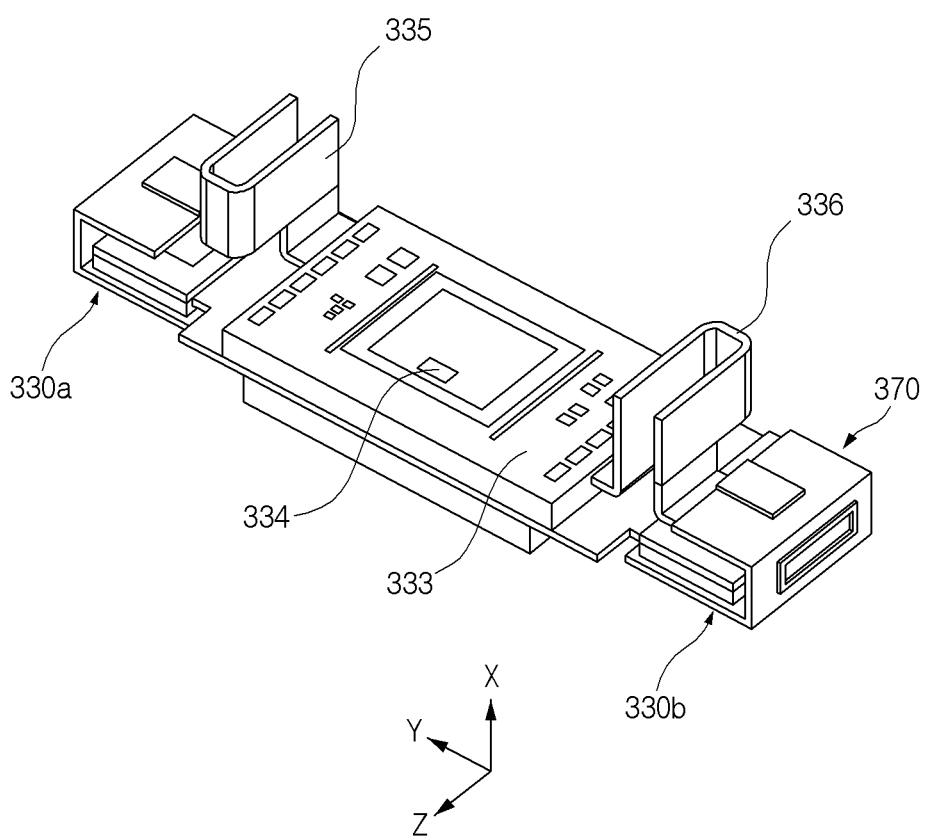
FIG. 15 is a perspective view illustrating a camera module and an image stabilization assembly according to various embodiments.

FIGS. 14A and 14B are perspective views illustrating a camera module and an image stabilization assembly according to various embodiments. FIG. 15 is a perspective view illustrating a camera module and an image stabilization assembly according to various embodiments. In describing FIGS. 14A, 14B and 15, repetitive descriptions identical or similar to ones given with reference to FIGS. 4 to 13 may not be repeated.

Referring to FIGS. 14A and 14B, the image stabilization assembly 330 may include a moving member 331, a first drive unit 330a, a second drive unit 330b, a first connecting member 335, and a second connecting member 336.

In an embodiment, the moving member 331 may include an image sensor 334 and a substrate 333 on which the image sensor 334 is disposed or to which the image sensor 334 is electrically connected. The moving member 331 and a lens assembly 210 may be disposed such that an optical axis is at least partially aligned with the image sensor 334.

In an embodiment, the first drive unit 330a may be located in the Y-axis direction with respect to the moving member 331. The first drive unit 330a may be configured to move the moving member 331 in the Y-axis direction and/or the Z-axis direction. In an embodiment, the first drive unit 330a may include a first coil 351, a second coil 352, a first magnet 341, and a second magnet 342. In an embodiment, the first magnet 341 and the second magnet 342 may be disposed on opposite surfaces of a first extending area of the moving member 331. For example, the first magnet 341 may be disposed on the surface of the moving member 331 that faces the +X-axis direction, and the second magnet 342 may be disposed on the surface of the moving member 331 that faces the −X-axis direction. The first coil 351 and the second coil 352 may be disposed on the first connecting member 335. For example, the first coil 351 and the second coil 352 may be located in a first portion 231-1 of a fixed frame 231 in the state of being mounted on the first connecting member 335.

In an embodiment, the first coil 351 and the second coil 352 may be formed in a shape surrounding any axis substantially parallel to the optical axis. In an embodiment, the first magnet 341 may be configured such that the surface facing the first coil 351 includes an N-pole area and an S-pole area. In this case, the first coil 351 and the first magnet 341 may be related to a movement of the moving member 331 in the Z-axis direction, and the N-pole area and the S-pole area of the first magnet 341 may be arranged in the Z-axis direction. In an embodiment, the second magnet 342 may be configured such that the surface facing the second coil 352 includes an N-pole area and an S-pole area. In this case, the second coil 352 and the second magnet 342 may be related to a movement of the moving member in the Y-axis direction, and the N-pole area and the S-pole area of the second magnet 342 may be arranged in the Y-axis direction.

In an embodiment, when an electric current is applied to the first coil 351, an electromagnetic force acting in the Z-axis direction may be applied to the first magnet 341, and the moving member 331 having the first magnet 341 disposed thereon may move in the Z-axis direction.

In an embodiment, when an electric current is applied to the second coil 352, an electromagnetic force acting in the Y-axis direction may be applied to the second magnet 342, and the moving member 331 having the second magnet 342 disposed thereon may move in the Y-axis direction.

In an embodiment, the second drive unit 330b may be located in the −Y-axis direction with respect to the moving member 331. The second drive unit 330b may be configured to move the moving member 331 in the Y-axis direction and/or the Z-axis direction. In an embodiment, the second drive unit 330b may include a third coil 353, a fourth coil 354, a third magnet 343, and a fourth magnet 344. In an embodiment, the third magnet 343 and the fourth magnet 344 may be disposed on opposite surfaces of a second extending area of the moving member 331. For example, the third magnet 343 may be disposed on the surface of the moving member 331 that faces the +X-axis direction, and the fourth magnet 344 may be disposed on the surface of the moving member 331 that faces the −X-axis direction. The third coil 353 and the fourth coil 354 may be disposed on the second connecting member 336. For example, the third coil 353 and the fourth coil 354 may be located in a second portion 231-2 of the fixed frame 231 in the state of being mounted on the second connecting member 336.

In an embodiment, the third coil 353 and the fourth coil 354 may be formed in a shape surrounding any axis substantially parallel to the optical axis. In an embodiment, the third magnet 343 may be configured such that the surface facing the third coil 353 includes an N-pole area and an S-pole area. In this case, the third coil 353 and the third magnet 343 may be related to a movement of the moving member 331 in the Z-axis direction, and the N-pole area and the S-pole area of the third magnet 343 may be arranged in the Z-axis direction. In an embodiment, the fourth magnet 344 may be configured such that the surface facing the fourth coil 354 includes an N-pole area and an S-pole area. In this case, the fourth coil 354 and the fourth magnet 344 may be related to a movement of the moving member 331 in the Y-axis direction, and the N-pole area and the S-pole area of the fourth magnet 344 may be arranged in the Y-axis direction.

In an embodiment, when an electric current is applied to the third coil 353, an electromagnetic force acting in the Z-axis direction may be applied to the third magnet 343, and the moving member 331 having the third magnet 343 disposed thereon may move in the Z-axis direction.

In an embodiment, when an electric current is applied to the fourth coil 354, an electromagnetic force acting in the Y-axis direction may be applied to the fourth magnet 344, and the moving member 331 having the fourth magnet 344 disposed thereon may move in the Y-axis direction.

In an embodiment, the first connecting member 335 may surround at least a portion of the substrate 333 and may be electrically connected with the first coil 351 and the second coil 352. The first connecting member 335 may be configured to transmit electrical signals applied to the first coil 351 and the second coil 352 and/or an image signal related to the image sensor 334. In an embodiment, the first connecting member 335 may extend from the edge of the substrate 333 that faces the −Y-axis direction and may extend to the first portion 231-1 of the fixed frame 231 along the edge facing the +Z-axis direction.

In an embodiment, the second connecting member 336 may surround at least a portion of the substrate 333 and may be electrically connected with the third coil 353 and the fourth coil 354. The second connecting member may be configured to transmit electrical signals applied to the third coil 353 and the fourth coil 354 and/or an image signal related to the image sensor 334. In an embodiment, the second connecting member 336 may extend from the edge of the substrate that faces the +Y-axis direction and may extend to the second portion 231-2 of the fixed frame 231 along the edge facing the −Z-axis direction.

As described above, the first connecting member 335 and the second connecting member 336 may be configured to be sufficiently long so as not to obstruct a movement of the moving member in an image stabilization operation. Tension acting on the moving member 331 and the substrate may be decreased by the first connecting member 335 and the second connecting member 336 that are sufficiently long. Accordingly, although the first connecting member 335 and the second connecting member 336 are physically connected with the substrate 333 included in the moving member 331, an influence on a movement of the moving member 331 may be minimized or reduced, and an image stabilization operation may be smoothly provided.

In various embodiments, the shapes of the first connecting member 335 and the second connecting member 336 are not necessarily limited to the shapes illustrated in FIGS. 14A and 14B. For example, referring to the image stabilization assembly 370 illustrated in FIG. 15, a first connecting member 335 and a second connecting member 336 may be disposed so as not to partially surround a substrate 333 and an image sensor 334. For example, the first connecting member 335 may be connected to a first drive unit 330a, and the second connecting member 336 may be connected to a second drive unit 330b. The first connecting member 335 and the second connecting member 336 may be disposed so as not to overlap each other in the Z-axis direction. Each of the first connecting member 335 and the second connecting member 336 of the image stabilization assembly 370 illustrated in FIG. 15 may have a relatively simplified shape and a relatively short extension length. In various embodiments, the first connecting member 335 and the second connecting member 336 may be formed to be relatively more flexible so as to compensate for tension relatively increased depending on the relatively short extension length. As the drive units 330a and 330b for driving the image sensor 334 in the Z-axis direction and the Y-axis direction are disposed on the opposite sides of the image sensor 334 in the Y-axis direction, the image stabilization assemblies 330 and 370 according to the embodiments illustrated in FIGS. 14A, 14B and 15 may be reduced in size in the Z-axis direction. Accordingly, the camera modules and the electronic device may be made slim.

Figure 16A:
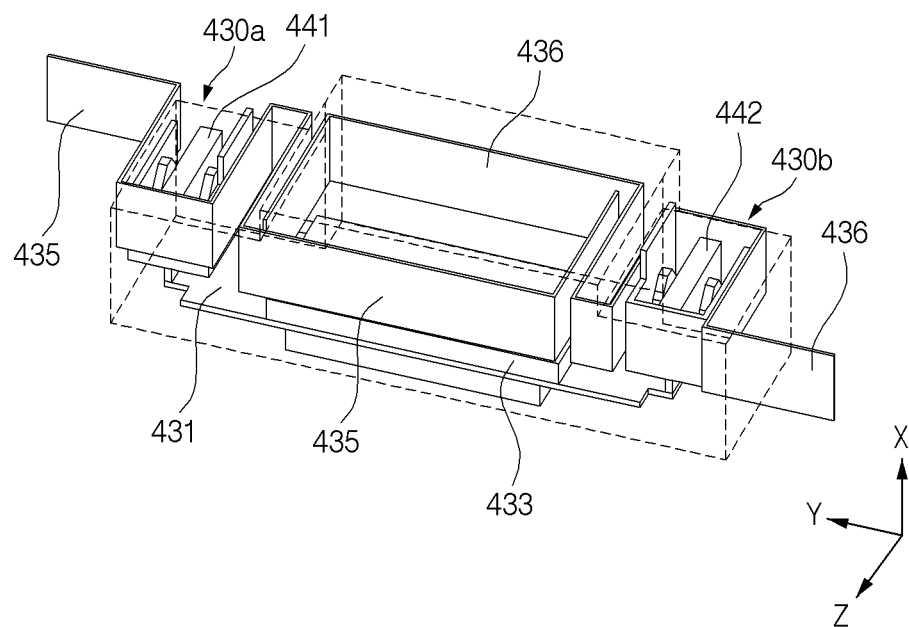
FIGS. 16A and 16B are perspective views illustrating a camera module and an image stabilization assembly according to various embodiments.
Figure 16B:
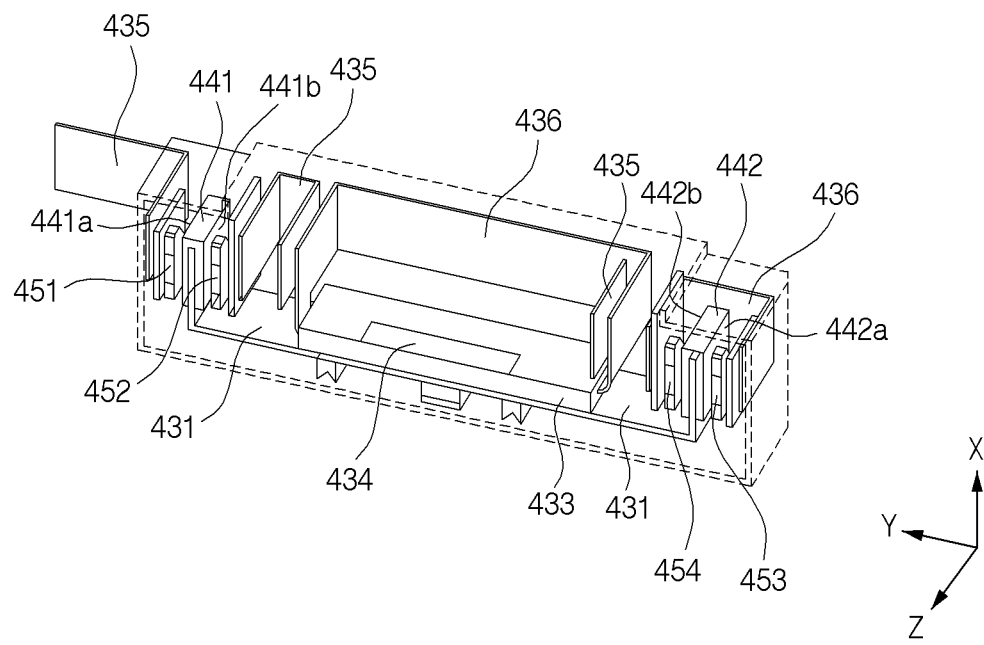

FIGS. 16A and 16B are perspective views illustrating a camera module and an image stabilization assembly according to various embodiments. In describing FIGS. 16A and 16B, repetitive descriptions identical or similar to ones given with reference to FIGS. 4 to 15 may not be repeated.

Referring to FIGS. 16A and 16B, the image stabilization assembly 430 may include a moving member 431, a first connecting member 435, a second connecting member 436, a first drive unit 430a, and a second drive unit 430b. The moving member 431, the first connecting member 435, and the second connecting member 436 are identical or similar to those described above with reference to FIGS. 14A and 14B.

In an embodiment, the moving member 431 may include an image sensor 434 and a substrate 433 on which the image sensor 434 is disposed or to which the image sensor 434 is electrically connected. The moving member 431 and a lens assembly 210 may be disposed such that an optical axis is at least partially aligned with the image sensor 434.

In an embodiment, the first connecting member 435 may surround at least a portion of the substrate 433 and may be electrically connected with a first coil 451 and a second coil 452. The first connecting member 435 may be configured to transmit electrical signals applied to the first coil 451 and the second coil 452 and/or an image signal related to the image sensor 434.

In an embodiment, the second connecting member 436 may surround at least a portion of the substrate 433 and may be electrically connected with a third coil 453 and a fourth coil 454. The second connecting member 436 may be configured to transmit electrical signals applied to the third coil 453 and the fourth coil 454 and/or an image signal related to the image sensor 434.

In an embodiment, the first drive unit 430a may be located in the Y-axis direction with respect to the moving member 431. The first drive unit 430a may be configured to move the moving member 431 in the Y-axis direction and/or the Z-axis direction. In an embodiment, the first drive unit 430a may include the first coil 451, the second coil 452, and a first magnet 441. The first coil 451 and the second coil 452 may be disposed on the first connecting member 435. In an embodiment, the first coil 451 and the second coil 452 may be formed in a shape surrounding any axis parallel to the Y-axis.

In an embodiment, the first coil 451 may be related to a movement in the Z-axis direction, and the second coil 452 may be related to a movement in the Y-axis direction. In an embodiment, the first magnet 441 may be configured such that a first surface 441a facing the first coil 451 includes an N-pole area and an S-pole area and a second surface 441b facing the second coil 452 has one polarity. In this case, the N-pole area and the S-pole area of the first surface 441a of the first magnet 441 may be arranged in the Z-axis direction.

In an embodiment, when an electric current is applied to the first coil 451, an electromagnetic force acting in the Z-axis direction may be applied to the first magnet 441, and the moving member 431 having the first magnet 441 disposed thereon may move in the Z-axis direction.

In an embodiment, when an electric current is applied to the second coil 452, an electromagnetic force acting in the Y-axis direction may be applied to the first magnet 441, and the moving member having the first magnet 441 disposed thereon may move in the Y-axis direction. In this case, the first magnet 441 may be configured to move between the first coil 451 and the second coil 452. For example, a magnetic field formed by the second coil 452 and the first magnet 441 may form an attractive force or a repulsive force. In the case of forming the attractive force, the moving member 431 may move in the −Y-axis direction, and in the case of forming the repulsive force, the moving member 431 may move in the Y-axis direction.

In various embodiments, the first coil 451 may be related to a movement in the Y-axis direction, and the second coil 452 may be related to a movement in the Z-axis direction. In various embodiments, the first magnet 441 may be configured such that the first surface 441a facing the first coil 451 has one polarity and the second surface 441b facing the second coil 452 includes an N-pole area and an S-pole area. In this case, the N-pole area and the S-pole area of the second surface 441b of the first magnet 441 may be arranged in the Z-axis direction.

In an embodiment, the second drive unit 430b may be located in the −Y-axis direction with respect to the moving member 431. The second drive unit 430b may be configured to move the moving member 431 in the Y-axis direction and/or the Z-axis direction. In an embodiment, the second drive unit 430b may include the third coil 453, the fourth coil 454, and a second magnet 442. The third coil 453 and the fourth coil 454 may be disposed on the second connecting member 436. In an embodiment, the third coil 453 and the fourth coil 454 may be formed in a shape surrounding any axis parallel to the Y-axis.

In an embodiment, the third coil 453 may be related to a movement in the Z-axis direction, and the fourth coil 454 may be related to a movement in the Y-axis direction. In an embodiment, the second magnet 442 may be configured such that a third surface 442a facing the third coil 453 includes an N-pole area and an S-pole area and a fourth surface 442b facing the fourth coil 454 has one polarity. In this case, the N-pole area and the S-pole area of the third surface 442a of the second magnet 442 may be arranged in the Z-axis direction.

In an embodiment, when an electric current is applied to the third coil 453, an electromagnetic force acting in the Z-axis direction may be applied to the third magnet 442, and the moving member 431 having the second magnet 442 disposed thereon may move in the Z-axis direction.

In an embodiment, when an electric current is applied to the fourth coil 454, an electromagnetic force acting in the Y-axis direction may be applied to the second magnet 442, and the moving member 431 having the second magnet 442 disposed thereon may move in the Y-axis direction. In this case, the second magnet 442 may be configured to move between the third coil 453 and the fourth coil 454. For example, a magnetic field formed by the fourth coil 454 and the second magnet 442 may form an attractive force or a repulsive force. In the case of forming the attractive force, the moving member 431 may move in the Y-axis direction, and in the case of forming the repulsive force, the moving member 431 may move in the −Y-axis direction.

In an embodiment, the third coil 453 may be related to a movement in the Y-axis direction, and the fourth coil 454 may be related to a movement in the Z-axis direction. In an embodiment, the second magnet 442 may be configured such that the third surface 442a facing the third coil 453 has one polarity and the second surface 442b facing the fourth coil 454 includes an N-pole area and an S-pole area. In this case, the N-pole area and the S-pole area of the fourth surface 442b of the second magnet 442 may be arranged in the Z-axis direction.

Figure 17:
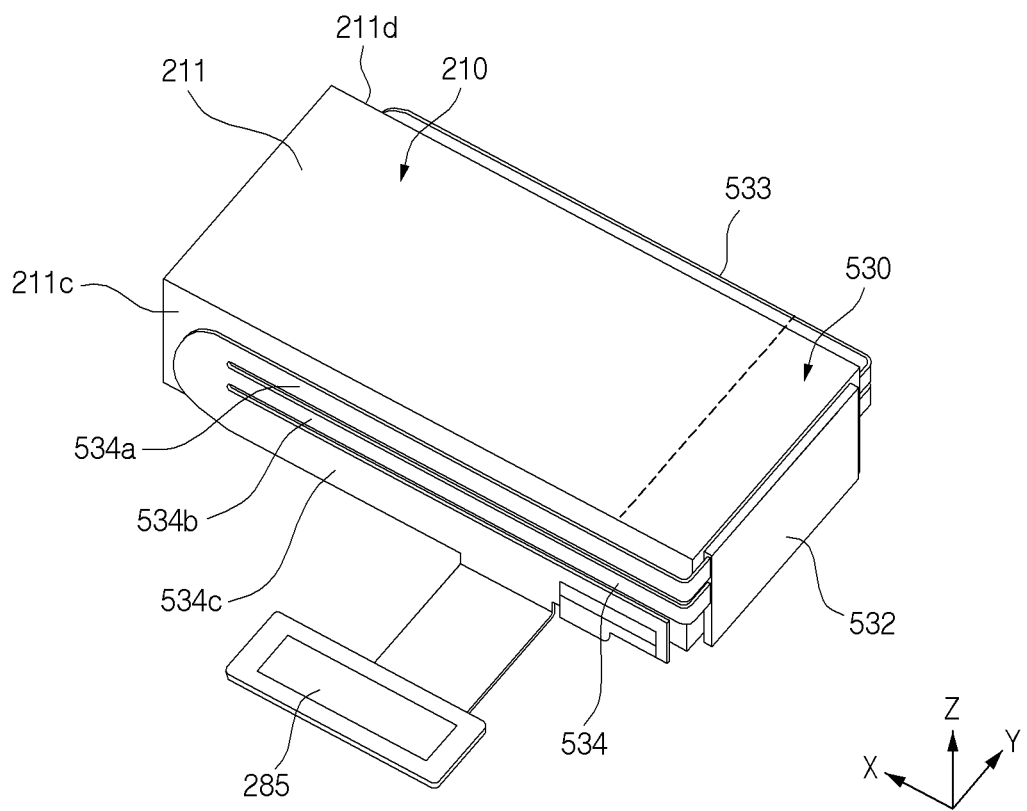
FIG. 17 is a perspective view illustrating connecting members of a camera module according to various embodiments.

FIG. 17 is a perspective view illustrating connecting members of a camera module according to various embodiments.

Referring to FIG. 17, the connecting members 533 and 534 may extend from a moving member 532 of an image stabilization assembly 530. The connecting members 533 and 534 may extend along the side surfaces 211c and 211d of a camera housing 211. The connecting members 533 and 534 may obstruct a movement of the moving member 532 when an image stabilization operation is performed. Accordingly, the camera module illustrated in FIG. 17, which includes the connecting members 533 and 534 having an increased length, may enable a smooth movement of the moving member.

In an embodiment, the connecting members 533 and 534 may include the first connecting member 533 extending along the first side surface 211d of the first camera housing 211 and the second connecting member 534 extending along the second side surface 211c. The first connecting member 533 and/or the second connecting member 534 may include a connector 285 coupled to a printed circuit board (e.g., the printed circuit board 150 of FIG. 3) of the electronic device 100.

In an embodiment, the connecting members 533 and 534 may include a first area 534a and a second area 534b that extend from the moving member 532 in an optical axis direction (e.g., the +X-axis direction) and a third area 534c at which the first area 534a and the second area 534b join together and that extends in the −X-axis direction. For example, the connecting members 533 and 534 may be coupled to the moving member 532, with the first area 534a and the second area 534b divided from each other. Accordingly, tension exerted on the moving member 532 by the connecting members 533 and 534 may be decreased.

FIG. 18 is a block diagram illustrating an example electronic device 1801 in a network environment 1800 according to various embodiments.

Referring to FIG. 18, the electronic device 1801 in the network environment 1800 may communicate with an electronic device 1802 via a first network 1898 (e.g., a short-range wireless communication network), or at least one of an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In various embodiments, at least one of the components (e.g., the connecting terminal 1878) may be omitted from the electronic device 1801, or one or more other components may be added in the electronic device 1801. In various embodiments, some of the components (e.g., the sensor module 1876, the camera module 1880, or the antenna module 1897) may be implemented as a single component (e.g., the display module 1860).

The processor 1820 may execute, for example, software (e.g., a program 1840) to control at least one other component (e.g., a hardware or software component) of the electronic device 1801 coupled with the processor 1820, and may perform various data processing or computation. According to an embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor

1821. For example, when the electronic device 1801 includes the main processor 1821 and the auxiliary processor 1823, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823. According to an embodiment, the auxiliary processor 1823 (e.g., the neural processing unit) may include a hardware structure specified for artificial intelligence model processing. An artificial intelligence model may be generated by machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by another component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1860 may visually provide information to the outside (e.g., a user) of the electronic device 1801.

The display module 1860 may include, for example, a display, a hologram device, or a projector and control circuitry to control a corresponding one of the display, hologram device, and projector. According to an embodiment, the display module 1860 may include a touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850, or output the sound via the sound output module 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to an embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth, wireless-fidelity (Wi-Fi) direct, or infrared data association (IrDA)) or the second network 1899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the mmWave band) to achieve, e.g., a high data transmission rate. The wireless communication module 1892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1892 may support various requirements specified in the electronic device 1801, an external electronic device (e.g., the electronic device 1804), or a network system (e.g., the second network 1899). According to an embodiment, the wireless communication module 1892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 1897 may transmit or receive a signal or power to or from the outside (e.g., the external electronic device) of the electronic device 1801. According to an embodiment, the antenna module 1897 may include an antenna including a radiating element including a conductive material or a conductive pattern formed in or on a substrate (e.g., a printed circuit board (PCB)). According to an embodiment, the antenna module 1897 may include a plurality of antennas (e.g., array antennas). In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

According to various embodiments, the antenna module 1897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 or 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide ultra low-latency services using, e.g., distributed computing or mobile edge computing. In an embodiment, the external electronic device 1804 may include an internet-of-things (IoT) device. The server 1808 may be an intelligent server using machine learning and/or a neural network. According to an embodiment, the external electronic device 1804 or the server 1808 may be included in the second network 1899. The electronic device 1801 may be applied to intelligent services (e.g., smart home, smart city, smart car, or healthcare) based on 5G communication technology or IoT-related technology.

Figure 19:
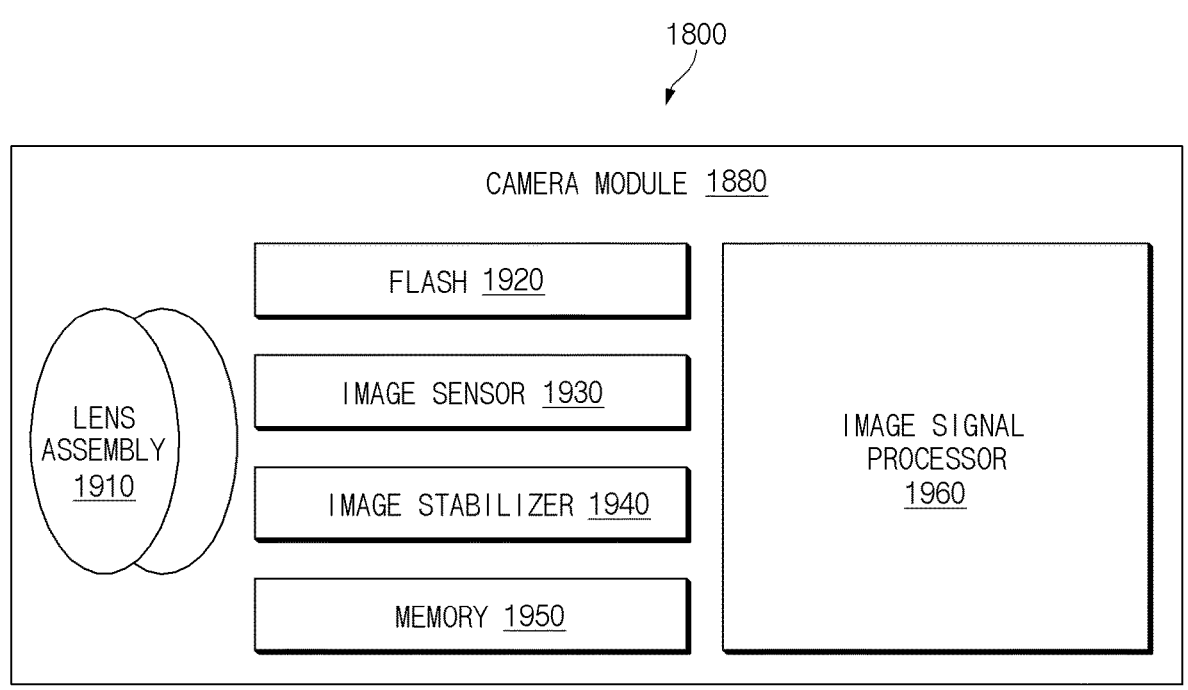
FIG. 19 is a block diagram illustrating an example configuration of a camera module according to various embodiments.

FIG. 19 is a block diagram 1900 illustrating an example configuration of the camera module 1880 according to various embodiments.

Referring to FIG. 19, the camera module 1880 may include a lens assembly 1910, a flash 1920, an image sensor 1930, an image stabilizer 1940, memory 1950 (e.g., buffer memory), or an image signal processor 1960. The lens assembly 1910 may collect light emitted or reflected from an object whose image is to be taken. The lens assembly 1910 may include one or more lenses. According to an embodiment, the camera module 1880 may include a plurality of lens assemblies 1910. In such a case, the camera module 1880 may form, for example, a dual camera, a 360-degree camera, or a spherical camera. Some of the plurality of lens assemblies 1910 may have the same lens attribute (e.g., view angle, focal length, auto-focusing, f number, or optical zoom), or at least one lens assembly may have one or more lens attributes different from those of another lens assembly. The lens assembly 1910 may include, for example, a wide-angle lens or a telephoto lens.

The flash 1920 may emit light that is used to reinforce light reflected from an object. According to an embodiment, the flash 1920 may include one or more light emitting diodes (LEDs) (e.g., a red-green-blue (RGB) LED, a white LED, an infrared (IR) LED, or an ultraviolet (UV) LED) or a xenon lamp. The image sensor 1930 may obtain an image corresponding to an object by converting light emitted or reflected from the object and transmitted via the lens assembly 1910 into an electrical signal. According to an embodiment, the image sensor 1930 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1930 may be implemented using, for example, a charged coupled device (CCD) sensor or a complementary metal oxide semiconductor (CMOS) sensor.

The image stabilizer 1940 may move the image sensor 1930 or at least one lens included in the lens assembly 1910 in a particular direction, or control an operational attribute (e.g., adjust the read-out timing) of the image sensor 1930 in response to the movement of the camera module 1880 or the electronic device 1801 including the camera module 1880. This allows compensating for at least part of a negative effect (e.g., image blurring) by the movement on an image being captured. According to an embodiment, the image stabilizer 1940 may sense such a movement by the camera module 1880 or the electronic device 1801 using a gyro sensor (not shown) or an acceleration sensor (not shown) disposed inside or outside the camera module 1880. According to an embodiment, the image stabilizer 1940 may be implemented, for example, as an optical image stabilizer.

The memory 1950 may store, at least temporarily, at least part of an image obtained via the image sensor 1930 for a subsequent image processing task. For example, if image capturing is delayed due to shutter lag or multiple images are quickly captured, a raw image obtained (e.g., a Bayer-patterned image, a high-resolution image) may be stored in the memory 1950, and its corresponding copy image (e.g., a low-resolution image) may be previewed via the display module 1860. Thereafter, if a specified condition is met (e.g., by a user's input or system command), at least part of the raw image stored in the memory 1950 may be obtained and processed, for example, by the image signal processor 1960. According to an embodiment, the memory 1950 may be configured as at least part of the memory 1830 or as a separate memory that is operated independently from the memory 1830.

The image signal processor 1960 may perform one or more image processing with respect to an image obtained via the image sensor 1930 or an image stored in the memory 1950. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1960 may perform control (e.g., exposure time control or read-out timing control) with respect to at least one (e.g., the image sensor 1930) of the components included in the camera module 1880. An image processed by the image signal processor 1960 may be stored back in the memory 1950 for further processing, or may be provided to an external component (e.g., the memory 1830, the display module 1860, the electronic device 1802, the electronic device 1804, or the server 1808) outside the camera module 1880. According to an embodiment, the image signal processor 1960 may be configured as at least part of the processor 1820, or as a separate processor that is operated independently from the processor 1820. If the image signal processor 1960 is configured as a separate processor from the processor 1820, at least one image processed by the image signal processor 1960 may be displayed, by the processor 1820, via the display module 1860 as it is or after being further processed.

According to an embodiment, the electronic device 1801 may include a plurality of camera modules 1880 having different attributes or functions. In such a case, at least one of the plurality of camera modules 1880 may form, for example, a wide-angle camera and at least another of the plurality of camera modules 1880 may forma telephoto camera. Similarly, at least one of the plurality of camera modules 1880 may form, for example, a front camera and at least another of the plurality of camera modules 1880 may forma rear camera.

A camera module according to various example embodiments of the disclosure may include: a lens assembly including a lens and an image stabilization assembly including a moving member including a first substrate and an image sensor electrically connected to the first substrate, the image stabilization assembly being connected to the lens assembly wherein an optical axis is at least partially aligned with the image sensor. The image stabilization assembly may be configured to move the moving member in at least one direction perpendicular to the optical axis such that the optical axis is aligned with a specified position on the image sensor.

In various example embodiments, the image stabilization assembly may further include a coil and a magnet configured to provide a movement of the moving member, and one of the coil and the magnet may be disposed on the moving member, and the other of the coil and the magnet may be disposed on a fixed part.

In various example embodiments, the coil and the magnet may be disposed to at least partially overlap each other when viewed in a direction of the optical axis.

In various example embodiments, wherein a surface of the magnet that faces the coil includes at least two polarities.

In various example embodiments, the coil may include a conductive wire wound around any axis parallel to the optical axis or a pattern formed in a direction surrounding any axis parallel to the optical axis.

In various example embodiments, the image sensor may be disposed on a first surface of the first substrate, and the coil may be disposed on a second surface of the first substrate facing away from the first surface.

In various example embodiments, the lens assembly may further include a focus drive configured to move the lens in a direction of the optical axis.

In various example embodiments, the image stabilization assembly may further include a fixed frame and a guide coupled to the fixed frame, and the guide may be coupled to the moving member and a sidewall of the fixed frame to be movable.

In various example embodiments, the guide may be coupled to the moving member to be movable in a first direction perpendicular to the optical axis and may be coupled to the sidewall of the fixed frame to be movable in a second direction perpendicular to the first direction and the optical axis.

In various example embodiments, the moving member may further include a holder to which the guide is coupled to be movable, and the holder may be fixedly coupled to the first substrate to move together with the first substrate.

In various example embodiments, the camera housing may further include a first ball disposed between the guide and the holder and a second ball disposed between the guide and the sidewall of the fixed frame. The first ball may be configured to provide a rolling frictional force between the holder and the guide structure based on the moving member moving in the first direction, and the second ball may be configured to provide a rolling frictional force between the guide and the sidewall of the fixed frame based on the moving member moving in the second direction.

In various example embodiments, each of the holder and the guide may have a first recess in which the first ball is at least partially accommodated, and the first recess may extend in the first direction. Each of the guide and the sidewall of the fixed frame may have a second recess in which the second ball is at least partially accommodated, and the second recess may extend in the second direction.

In various example embodiments, based on the moving member moving, the first ball may rotate while linearly moving in the first direction within the first recess, or may rotate in a specified position within the first recess. Based on the moving member moving, the second ball may rotate while linearly moving in the second direction within the second recess, or may rotate in a specified position within the second recess.

In various example embodiments, when the moving member moves in the first direction, the guide may be fixed in a specified position, and when the moving member moves in the second direction, the guide may move together with the moving member.

In various example embodiments, the image stabilization assembly may further include a first drive unit configured to move the moving member in the first direction and a second drive unit configured to move the moving member and the guide in the second direction. The first drive unit may include a first magnet, a first coil at least partially overlapping the first magnet in a direction of the optical axis, a second magnet, and a second coil at least partially overlapping the second magnet in the direction of the optical axis. The second drive unit may include a third magnet, a third coil at least partially overlapping the third magnet in the direction of the optical axis, a fourth magnet, and a fourth coil at least partially overlapping the fourth magnet in the direction of the optical axis.

In various example embodiments, each of the first coil and the second coil may be formed such that a portion that extends in the first direction is longer than a portion that extends in the second direction, and each of the third coil and the fourth coil may be formed such that a portion that extends in the first direction is smaller than a portion that extends in the second direction.

In various example embodiments, each of the first magnet and the second magnet may be configured such that an N-pole area and an S-pole area are arranged in the first direction, and each of the third magnet and the fourth magnet may be configured such that an N-pole area and an S-pole area are arranged in the second direction.

In various example embodiments, the first magnet and the second magnet may be arranged in the second direction, and the third magnet and the fourth magnet may be arranged in the first direction.

In various example embodiments, the lens assembly may further include a prism disposed on the optical axis.

In various example embodiments, the camera module may further include a connecting member comprising a connector extending from the first substrate to a printed circuit board included in an electronic device, and the connecting member may include a flexible area having a shape deformable in response to a movement of the moving member.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s).

What is claimed is:

1. A camera module comprising:
a camera housing including a light receiving area;
a lens assembly disposed in the camera housing and including a lens;
a reflective member configured to reflect light entering through the light receiving area to the lens; and
an image stabilization assembly connected to the lens assembly and comprising a connecting member, a fixed frame configured to surround at least a portion of the connecting member, a guide, and a moving member,
wherein the moving member includes a first substrate, a holder movable with the first substrate, and an image sensor disposed on a first side of the first substrate,
wherein the holder includes an opening aligned with the image sensor, the image sensor faces the lens assembly through the opening in the holder, and an optical axis is at least partially aligned with the image sensor,
wherein the guide is coupled to the holder for movement in a first direction perpendicular to the optical axis and coupled to the fixed frame for movement in a second direction perpendicular to the optical axis,
wherein the image stabilization assembly comprises a coil and a magnet operable to drive the moving member in at least one direction perpendicular to the optical axis such that the optical axis is aligned with a specified position on the image sensor,
wherein the connecting member is configured to transmit a signal from the image sensor and comprises a second substrate movable in the first and second directions, a fixedly disposed third substrate, a first flexible connecting portion connecting the first substrate and the second substrate, and a second flexible connecting portion connecting the second substrate and the third substrate,
wherein the second flexible connecting portion is formed by overlapping a plurality of layers, and
wherein the coil is disposed on a second side of the first substrate opposite the first side and the magnet is disposed on a first surface of the fixed frame.

2. The camera module of claim 1, wherein the coil and the magnet at least partially overlap each other when viewed in a direction of the optical axis.

3. The camera module of claim 1, wherein a surface of the magnet facing the coil includes at least two polarities.

4. The camera module of claim 1, wherein the coil includes a conductive wire wound around any axis parallel to the optical axis or a pattern formed in a direction surrounding any axis parallel to the optical axis.

5. The camera module of claim 1, wherein the lens assembly further includes a focus driver configured to move the lens in a direction of the optical axis.

6. The camera module of claim 1, further comprising:
a first ball disposed between the guide and the holder; and
a second ball disposed between the guide and the fixed frame,
wherein the first ball is configured to provide a rolling frictional force between the holder and the guide based on the moving member moving in the first direction, and
wherein the second ball is configured to provide a rolling frictional force between the guide and the fixed frame based on the moving member moving in the second direction.

7. The camera module of claim 6, wherein each of the holder and the guide include a first recess in which the first ball is at least partially accommodated, and the first recess extends in the first direction, and wherein each of the guide and the fixed frame include a second recess in which the second ball is at least partially accommodated, and the second recess extends in the second direction.

8. The camera module of claim 7, wherein, based on the moving member moving, the first ball is configured to rotate while linearly moving in the first direction within the first recess, or to rotate at a specified position within the first recess, and wherein, based on the moving member moving, the second ball is configured to rotate while linearly moving in the second direction within the second recess, or to rotate at a specified position within the second recess.

9. The camera module of claim 1, wherein, when the moving member moves in the first direction, the guide is fixed at a specified position, and, when the moving member moves in the second direction, the guide moves together with the moving member.

10. The camera module of claim 1, wherein the coil and the magnet comprise:

a first magnet, a first coil at least partially overlapping the first magnet in a direction of the optical axis, a second magnet, and a second coil at least partially overlapping the second magnet in the direction of the optical axis configured to move the moving member in the first direction, and a third magnet, a third coil at least partially overlapping the third magnet in the direction of the optical axis, a fourth magnet, and a fourth coil at least partially overlapping the fourth magnet in the direction of the optical axis configured to move the moving member and the guide in the second direction.

11. The camera module of claim 10, wherein each of the first magnet and the second magnet is disposed such that an N-pole area and an S-pole area are arranged in the first direction, and wherein each of the third magnet and the fourth magnet is disposed such that an N-pole area and an S-pole area are arranged in the second direction.

12. The camera module of claim 10, wherein the first magnet and the second magnet are arranged in the second direction, and wherein the third magnet and the fourth magnet are arranged in the first direction.

13. The camera module of claim 1, wherein the lens assembly further includes a prism disposed on the optical axis.

14. An electronic device comprising the camera module of claim 1.

15. A smart phone comprising the camera module of claim 1.

16. A camera module comprising:

a camera housing including a light receiving area;

a lens assembly disposed in the camera housing and including a lens;

a reflective member configured to reflect light entering through the light receiving area to the lens; and an image stabilization assembly comprising a fixed frame and a moving member including a first substrate and an image sensor disposed on a first side of the first substrate, the image stabilization assembly being connected to the lens assembly and an optical axis being at least partially aligned with the image sensor, wherein the image stabilization assembly comprises a coil and a magnet operable to drive the moving member in at least one direction perpendicular to the optical axis such that the optical axis is aligned with a specified position on the image sensor, wherein the coil is disposed on a second side of the first substrate opposite the first side and the magnet is disposed on a first surface of the fixed frame, wherein the first substrate is disposed between the lens assembly and the first surface of the fixed frame, wherein the coil and the magnet comprise a first magnet, a first coil at least partially overlapping the first magnet in a direction of the optical axis, a second magnet, and a second coil at least partially overlapping the second magnet in the direction of the optical axis configured to move the moving member in a first direction, and a third magnet, a third coil at least partially overlapping the third magnet in the direction of the optical axis, a fourth magnet, and a fourth coil at least partially overlapping the fourth magnet in the direction of the optical axis configured to move the moving member and a guide in a second direction, wherein each of the first coil and the second coil is formed such that a portion extending in the first direction is longer than a portion extending in the second direction, and wherein each of the third coil and the fourth coil is formed such that a portion extending in the first direction is smaller than a portion extending in the second direction.

17. An electronic device comprising the camera module of claim 16.

18. A smart phone comprising the camera module of claim 16.

* * * * *